US011073542B2

(12) United States Patent
Sugahara

(10) Patent No.: US 11,073,542 B2
(45) Date of Patent: Jul. 27, 2021

(54) INFORMATION PROCESSING SYSTEM, AND METHOD FOR DETERMINING AUTHENTICITY OF APPURTENANCE DEVICE

(71) Applicant: MegaChips Corporation, Osaka (JP)

(72) Inventor: Takahiko Sugahara, Osaka (JP)

(73) Assignee: MEGACHIPS CORPORATION, Osaka (JP)

( * ) Notice: Subject to any disclaimer, the term of this patent is extended or adjusted under 35 U.S.C. 154(b) by 369 days.

(21) Appl. No.: 16/219,975

(22) Filed: Dec. 14, 2018

(65) Prior Publication Data
US 2019/0187194 A1 Jun. 20, 2019

(30) Foreign Application Priority Data
Dec. 15, 2017 (JP) .............................. JP2017-240478

(51) Int. Cl.
| | | |
|---|---|---|
| *G01R 21/133* | (2006.01) | |
| *G01R 21/06* | (2006.01) | |
| *G06F 1/26* | (2006.01) | |
| *G06F 11/28* | (2006.01) | |
| *G01R 19/165* | (2006.01) | |
| *G06F 11/30* | (2006.01) | |
| *G06F 21/00* | (2013.01) | |
| *G06F 1/28* | (2006.01) | |

(52) U.S. Cl.
CPC ....... *G01R 21/133* (2013.01); *G01R 19/1659* (2013.01); *G01R 19/16528* (2013.01); *G01R 21/06* (2013.01); *G06F 1/266* (2013.01); *G06F 1/28* (2013.01); *G06F 11/28* (2013.01); *G06F 11/3062* (2013.01); *G06F 21/00* (2013.01); *G06F 2201/81* (2013.01)

(58) Field of Classification Search
CPC .......... G01R 19/16528; G01R 19/1659; G01R 21/06; G01R 21/133; G06F 11/28; G06F 11/3062; G06F 1/266; G06F 1/28; G06F 21/00; G06F 2201/81
USPC .......................................................... 702/61
See application file for complete search history.

(56) References Cited

U.S. PATENT DOCUMENTS

| | | | | |
|---|---|---|---|---|
| 10,474,846 | B1 * | 11/2019 | Rezayee | G06F 1/28 |
| 2015/0046715 | A1 * | 2/2015 | Ignatchenko | H04L 9/3278 |
| | | | | 713/176 |
| 2017/0293337 | A1 * | 10/2017 | Ittogi | G06F 1/266 |

FOREIGN PATENT DOCUMENTS

| | | |
|---|---|---|
| JP | 2010-79410 A | 4/2010 |
| JP | 6068878 B2 | 1/2017 |

OTHER PUBLICATIONS

Japanese Office Action dated Mar. 8, 2019 in Japanese Application No. 2017-240478.

* cited by examiner

*Primary Examiner* — John H Le
(74) *Attorney, Agent, or Firm* — Xsensus LLP

(57) ABSTRACT

Circuitry is configured to cause a memory device to perform a predetermined power consumption operation for authentication of the memory device in addition to a normal operation, and determine whether the memory device is an authorized or an unauthorized product, based on a measured current value measured in a period when the memory device performs the power consumption operation and a reference current value that is a current value in the power consumption operation by an authorized product.

31 Claims, 20 Drawing Sheets

W1

W2

W3

W1

W2

W3

INFORMATION PROCESSING SYSTEM, AND METHOD FOR DETERMINING AUTHENTICITY OF APPURTENANCE DEVICE

CROSS REFERENCE TO RELATED APPLICATIONS

The present application is based on, and claims priority from Japanese Patent Application Serial Number 2017-240478, the disclosure of which is hereby incorporated by reference herein in its entirety.

BACKGROUND

Technical Field

The present disclosure relates to an information processing system, a non-transitory computer-readable recording medium, and a method for determining the authenticity of an appurtenance device.

Related Art

JP6068878B describes a memory system including an information processing device and a memory device connected thereto. The memory system measures a current consumption between the information processing device and the memory device in a normal operation at the power-on of the memory device, calculates a rate of change in the current consumption from the amount of change in the current consumption per unit time, and compares a pattern of the rate of the change in the current consumption produced for the memory device and that for an authorized product, to determine whether or not the memory device is an authorized product.

SUMMARY

An information processing system includes an information processing device and an appurtenance device configured to be connected to the information processing device. The information processing device includes circuitry configured to supply power to the appurtenance device, measure a current from the information processing device to the appurtenance device, cause the appurtenance device to perform a predetermined power consumption operation for authentication of the appurtenance device in addition to a normal operation, and determine whether the appurtenance device is an authorized or an unauthorized product, based on a measured current value measured in a period when the appurtenance device performs the power consumption operation and a reference current value that is a current value in the power consumption operation by an authorized or an unauthorized product.

An information processing system includes an information processing device and an appurtenance device configured to be connect the information processing device. The appurtenance device includes circuitry configured to perform a predetermined power consumption operation for authentication of the appurtenance device by the information processing device in addition to a normal operation. The information processing device includes circuitry configured to supply power to the appurtenance device, measure a current from the information processing device to the appurtenance device, and determine whether the appurtenance device is an authorized or an unauthorized product, based on a measured current value measured in a period when the appurtenance device performs the power consumption operation, and a reference current value that is a current value in the power consumption operation by an authorized or an unauthorized product.

A method for determining the authenticity of an appurtenance device configured to be connected to an information processing device is a method of determining whether the appurtenance device is an authorized or an unauthorized product. The information processing device to which an appurtenance device is to be connected includes circuitry configured to supply power to the appurtenance device, and measure a current from the information processing device to the appurtenance device. The method includes causing the appurtenance device to perform a predetermined power consumption operation for authentication of the appurtenance device in addition to a normal operation, and determine whether the appurtenance device is an authorized or an unauthorized product, based on a measured current value measured in a period when the appurtenance device performs the power consumption operation and a reference current value that is a current value in the power consumption operation by an authorized or an unauthorized product.

DETAILED DESCRIPTION

Figure 1:
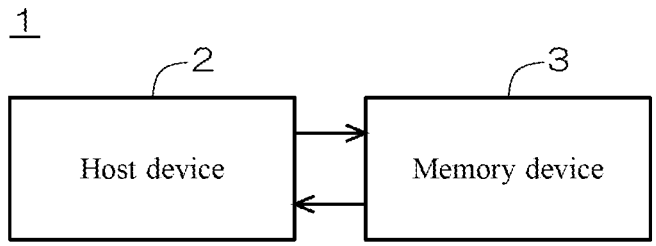
FIG. 1 is a diagram illustrating a configuration of a memory system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing. The term "circuitry" herein may be partly or entirely implemented by using either hardware or software, or both hardware and software.

The memory system described in JP6068878B may occasionally have low accuracy of authenticity determination, since determination is based on the way the current consumption changes due to a normal operation of the memory device. For example, a memory device connected to the information processing device, which is an inferior unauthorized product having a far greater absolute value of current consumption than an authorized product, may possibly be determined erroneously to be an authorized product, if the pattern of rates of change in current consumption of the memory device accidentally matches that of an authorized product at a measurement timing of current consumption.

The present disclosure is directed to an information processing system, a non-transitory computer-readable recording medium, and a method for determining the authenticity of an appurtenance device, for achieving highly accurate authenticity determination of whether an appurtenance device connected to an information processing device is an authorized or an unauthorized product.

An information processing system according to an aspect of the present disclosure includes an information processing device, and an appurtenance device configured to be connected to the information processing device. The information processing device includes a power supply unit configured to supply power to the appurtenance device, a current measurement unit configured to measure a current from the power supply unit to the appurtenance device, a controller configured to cause the appurtenance device to perform a predetermined power consumption operation for authentication of the appurtenance device in addition to a normal operation, and a determination unit configured to determine whether the appurtenance device is an authorized or an unauthorized product, based on a measured current value measured by the current measurement unit in a period when the appurtenance device performs the power consumption operation and a known reference current value that is a current value in the power consumption operation by an authorized or an unauthorized product. The power supply unit, the current measurement unit, the controller, and the determination unit may comprise suitable logic, circuitry, interfaces, and/or code.

In the information processing system according to this aspect, the controller causes the appurtenance device to perform the predetermined power consumption operation for authentication of the appurtenance device in addition to the normal operation. The determination unit determines whether the appurtenance device is an authorized or an unauthorized product, based on a measured current value measured by the current measurement unit in a period when the appurtenance device performs the power consumption operation and a known reference current value that is a current value in the power consumption operation by an authorized product (or unauthorized product). When an unauthorized product is not able to perform the power consumption operation, the measured current value does not match the reference current value. Thus authenticity determination of the appurtenance device is readily performable by the determination unit. Even when an unauthorized product is able to perform the power consumption operation, since an authorized and an unauthorized products have different power consumption characteristics due to differences in the device structure, the manufacturing process, and the like, the measured current value of an unauthorized product (or authorized product) does not match the reference current value of an authorized product (or unauthorized product). Thus authenticity determination of the appurtenance device is readily performable by the determination unit. Moreover, since the power consumption operation for authentication of the appurtenance device is not the normal operation of the appurtenance device but an independent operation added to the normal operation, the appurtenance device can be caused to perform any arbitrary power consumption operation having noticeable current consumption values or current consumption values that change noticeably. In consequence, the determination unit improves accuracy in authenticity determination.

In some embodiments, the controller is configured to cause the appurtenance device to perform the power consumption operation in a pause period when the appurtenance device pauses an operation in the normal operation.

According to such embodiments, the controller causes the appurtenance device to perform the power consumption operation in the pause period when the appurtenance device pauses an operation in the normal operation. In the pause period, the current consumption and the amount of change thereof due to the normal operation are small. Thus performing the power consumption operation in the pause period makes the current consumption of the appurtenance device due to the power consumption operation and the way it changes apparent. This makes the measured current values in the determination unit readily analyzable.

In some embodiments, the controller is configured to cause the appurtenance device to perform the power consumption operation in a latency time after sending a command from the information processing device to the appurtenance device until a response from the appurtenance device to the information processing device in the normal operation.

According to such embodiments, the controller causes the appurtenance device to perform the power consumption operation in a latency time after sending a command from the information processing device to the appurtenance device until a response from the appurtenance device to the information processing device in the normal operation. Effective use of the latency time eliminates need for securing a period for performing the power consumption operation in addition to a period for performing the normal operation, which prevents delay in the normal operation due to the power consumption operation.

An information processing system according to another aspect of the present disclosure includes an information processing device, and an appurtenance device configured to be connected to the information processing device. The appurtenance device includes a controller configured to perform a predetermined power consumption operation for authentication of the appurtenance device by the information processing device in addition to a normal operation. The information processing device includes a power supply unit configured to supply power to the appurtenance device, a current measurement unit configured to measure a current from the power supply unit to the appurtenance device, and a determination unit configured to determine whether the appurtenance device is an authorized or an unauthorized product, based on a measured current value measured by the current measurement unit in a period when the appurtenance device performs the power consumption operation and a known reference current value that is a current value in the power consumption operation by an authorized or an unauthorized product. The controller, the power supply unit, the current measurement unit, and the determination unit may comprise suitable logic, circuitry, interfaces, and/or code.

In the information processing system according to this aspect, the controller performs a predetermined power consumption operation for authentication of the appurtenance device by the information processing device in addition to the normal operation. The determination unit determines whether the appurtenance device is an authorized or an unauthorized product, based on a measured current value measured by the current measurement unit in a period when the appurtenance device performs the power consumption operation and a known reference current value that is a current value in the power consumption operation by an authorized product (or unauthorized product). When an unauthorized product is not able to perform the power consumption operation, the measured current value does not match the reference current value. Thus authenticity determination of the appurtenance device is readily performable by the determination unit. Even when an unauthorized product is able to perform the power consumption operation, since an authorized and an unauthorized products have different power consumption characteristics due to differences in the device structure, the manufacturing process, and the like, the measured current value of an unauthorized product (or authorized product) does not match the reference current value of an authorized product (or unauthorized product). Thus authenticity determination of the appurtenance device is readily performable by the determination unit. Moreover, since the power consumption operation for authentication of the appurtenance device by the information processing device is not the normal operation of the appurtenance device but a redundant operation added to the normal operation, the appurtenance device can perform any arbitrary power consumption operation having noticeable current consumption values or current consumption values that change noticeably. In consequence, the determination unit improves accuracy in authenticity determination. Since the appurtenance device voluntarily starts the power consumption operation, the information processing device does not need to send a control command for starting the power consumption operation to the appurtenance device. In consequence, data communications between the information processing device and the appurtenance device are reduced. Moreover, no possibility for a third party to eavesdrop the control command on the communication path between these devices increases security.

In some embodiments, the controller is configured to perform the power consumption operation in a pause period when the appurtenance device pauses an operation in the normal operation.

According to such embodiments, the controller performs the power consumption operation in the pause period when the appurtenance device pauses an operation in the normal operation. In the pause period, the current consumption and the amount of change thereof due to the normal operation are small. Thus performing the power consumption operation in the pause period makes the current consumption of the appurtenance device due to the power consumption operation and the way it changes apparent. This makes the measured current values in the determination unit readily analyzable.

In some embodiments, the controller is configured to perform the power consumption operation in a latency time after sending a command from the information processing device to the appurtenance device until a response from the appurtenance device to the information processing device in the normal operation.

According to such embodiments, the controller performs the power consumption operation in a latency time after sending a command from the information processing device to the appurtenance device until a response from the appurtenance device to the information processing device in the normal operation. Effective use of the latency time eliminates need for securing a period for performing the power consumption operation in addition to a period for performing the normal operation, which prevents delay in the normal operation due to the power consumption operation.

In some embodiments, the appurtenance device includes a control circuit that contributes to the normal operation. The controller is configured to cause the control circuit to perform the power consumption operation.

According to such embodiments, the controller causes the control circuit that contributes to the normal operation of the appurtenance device to perform the power consumption operation. No need for providing an additional circuit dedicated to the power consumption operation effectively prevents increase in circuit size in the appurtenance device.

In some embodiments, the control circuit includes M logic circuits, where M is a plural number. The controller is configured to cause each of the M logic circuits to perform the power consumption operation. The determination unit is configured to compare measured current values with reference current values for the M logic circuits, and determine whether the appurtenance device is an authorized or an unauthorized product, depending on whether all measured current values match the reference current values in M-time comparison.

According to such embodiments, the determination unit compares the measured current values with the reference current values of the M logic circuits, and determines whether the appurtenance device is an authorized or an unauthorized product, depending on whether all measured current values match the reference current values in the M-time comparison. Thus when an unauthorized product has measured current values that are different from those of an authorized product in some of the M logic circuits, such unauthorized product is eliminated with high accuracy by the determination unit.

In some embodiments, the control circuit includes M logic circuits, where M is a plural number. The controller is configured to cause each of the M logic circuits to perform the power consumption operation. The determination unit is configured to compare measured current values with reference current values for the M logic circuits, and determine whether the appurtenance device is an authorized or an unauthorized product, depending on whether a proportion of results that the measured current value matches the reference current value in M-time comparison is larger than or equal to a first threshold.

According to such embodiments, the determination unit compares the measured current values with the reference current values of the M logic circuits, and determines whether the appurtenance device is an authorized or an unauthorized product, depending on whether a proportion of results that the measured current value matches the reference current value in M-time comparison is larger than or equal to the first threshold. This effectively prevents an authorized product from being erroneously determined to be an unauthorized product, even when a measured current value of an authorized product instantaneously increase or decrease in part of M logic circuits due to unexpected noise or the like.

In some embodiments, the appurtenance device includes a memory circuit that contributes to the normal operation. The controller is configured to cause the memory circuit to perform the power consumption operation.

According to such embodiments, the controller causes the memory circuit to perform the power consumption operation. No need for providing an additional circuit dedicated to the power consumption operation effectively prevents increase in circuit size in the appurtenance device.

In some embodiments, the appurtenance device includes an additional circuit that does not contribute to the normal operation. The controller is configured to cause the additional circuit to perform power the consumption operation.

According to such embodiments, the appurtenance device includes the additional circuit that does not contribute to the normal operation. The controller causes the additional circuit to perform the power consumption operation. Causing the additional circuit to perform an arbitrary power consumption operation having noticeable current consumption values or current consumption values that change noticeably improves accuracy in authenticity determination by the determination unit.

In some embodiments, the determination unit includes a pattern producing unit configured to chronologically arrange a plurality of measured current values measured by the current measurement unit to produce a measured current value pattern, and a pattern comparing unit configured to compare the measured current value pattern produced by the pattern producing unit with a known reference current value pattern having chronologically-arranged reference current values. The determination unit is configured to determine whether the appurtenance device is an authorized or an unauthorized product, based on a comparison result by the pattern comparing unit. The pattern producing unit and the pattern comparing unit may comprise suitable logic, circuitry, interfaces, and/or code.

According to such embodiments, the pattern comparing unit compares a measured current value pattern produced by the pattern producing unit with a known reference current value pattern having chronologically-arranged reference current values. The determination unit determines whether the appurtenance device is an authorized or an unauthorized product, based on the comparison result by the pattern comparing unit. Since unauthorized products tend to be inferior, absolute values of current consumption of unauthorized products are often larger than those of authorized products. The determination unit compares a measured current value pattern, rather than a pattern of rates of change in current consumption, with a reference current value pattern. This achieves highly accurate authenticity determination of the appurtenance device, even when an authorized and an unauthorized products have a similar pattern of rates of change in current consumption.

In some embodiments, the pattern comparing unit is configured to compare the measured current values composing the measured current value pattern with the reference current values composing the reference current value pattern, respectively. The determination unit is configured to determine whether the appurtenance device is an authorized or an unauthorized product, depending on whether all measured current values match corresponding reference current values.

According to such embodiments, the determination unit determines whether the appurtenance device is an authorized or an unauthorized product, depending on whether all measured current values match corresponding reference current values. Thus when an unauthorized product (or authorized product) has a measured current value pattern that is different in part from the reference current value pattern of an authorized product (or unauthorized product), the authenticity determination of the appurtenance device is achieved with high accuracy.

In some embodiments, the pattern comparing unit is configured to compare the measured current values composing the measured current value pattern with the reference current values composing the reference current value pattern respectively. The determination unit is configured to determine whether the appurtenance device is an authorized or an unauthorized product, depending on whether a proportion of measured current values that match corresponding reference current values of all measured current values is larger than or equal to a second threshold.

According to such embodiments, the determination unit determines whether the appurtenance device is an authorized or an unauthorized product, depending on whether a proportion of measured current values that match corresponding reference current values of all measured current values is larger than or equal to a second threshold. This effectively prevents an authorized product (or unauthorized product) from being erroneously determined to be an unauthorized product (or authorized product), even when the measured current values of the authorized product (or unauthorized product) instantaneously increase or decrease due to unexpected noise or the like.

In some embodiments, the determination unit is configured to perform current measurement by the current measurement unit, pattern production by the pattern producing unit, and pattern comparison by the pattern comparing unit for N times, where N is a plural number, and determine whether the appurtenance device is an authorized or an unauthorized product, depending on whether a proportion of results that the measured current value pattern matches the reference current value pattern in N-time comparison by the pattern comparing unit is larger than or equal to a third threshold.

According to such embodiments, the determination unit performs current measurement by the current measurement unit, pattern production by the pattern producing unit, and pattern comparison by the pattern comparing unit for N times, and determines whether the appurtenance device is an authorized or an unauthorized product, depending on whether a proportion of results that the measured current value pattern matches the reference current value pattern in N-time comparison by the pattern comparing unit is larger than or equal to the third threshold. Repeating a series of processes by the current measurement unit, the pattern producing unit, and the pattern comparing unit for multiple N times, and performing authenticity determination of the appurtenance device based on results of N-time comparison by the pattern comparing unit improves determination accuracy.

In some embodiments, the determination unit includes a cycle calculating unit configured to calculate a change cycle of measured current values measured by the current measurement unit, and a cycle comparing unit configured to compare the change cycle of the measured current values calculated by the cycle calculating unit with a known change cycle of reference current values. The determination unit is configured to determine whether the appurtenance device is an authorized or an unauthorized product based on a comparison result by the cycle comparing unit. The cycle calculating unit and the cycle comparing unit may comprise suitable logic, circuitry, interfaces, and/or code.

According to such embodiments, the cycle calculating unit calculates a change cycle of the measured current values measured by the current measurement unit, and the cycle comparing unit compares the change cycle of measured current values calculated by the cycle calculating unit with a known change cycle of reference current values. The determination unit determines whether the appurtenance device is an authorized or an unauthorized product based on a comparison result by the cycle comparing unit. Authorized and unauthorized products have different device structures, the manufacturing processes, and the like, resulting in difference in change cycles of the measured current values due to a power consumption operation between authorized and unauthorized products. Comparing a change cycle of the measured current values with a change cycle of the reference current values facilitates authenticity determination of the appurtenance device.

In some embodiments, the determination unit is configured to perform current measurement by the current measurement unit, cycle calculation by the cycle calculating unit, and cycle comparison by the cycle comparing unit for N times, where N is a plural number, determine whether the appurtenance device is an authorized or an unauthorized product, depending on whether a proportion of results that the change cycle of the measured current values matches the change cycle of the reference current values in N-time comparison by the cycle comparing unit is larger than or equal to a fourth threshold.

According to such embodiments, the determination unit performs current measurement by the current measurement unit, cycle calculation by the cycle calculating unit, and cycle comparison by the cycle comparing unit for multiple N times, and determines whether the appurtenance device is an authorized or an unauthorized product, depending on whether a proportion of results that the change cycle of the measured current values matches the change cycle of the reference current values of N-time comparison by the cycle comparing unit is larger than or equal to a fourth threshold. Repeating a series of processes by the current measurement unit, the cycle calculating unit, and the cycle comparing unit for multiple N times, and performing authenticity determination of the appurtenance device based on results of N-time comparison by the cycle comparing unit improves determination accuracy.

In some embodiments, the determination unit is configured to determine whether the appurtenance device is an authorized or an unauthorized product, depending on whether a change in measured current values measured by the current measurement unit between before and after the appurtenance device starts the power consumption operation is larger than or equal to the fifth threshold.

According to such embodiments, the determination unit determines whether the appurtenance device is an authorized or an unauthorized product, depending on whether a change in measured current values measured by the current measurement unit between before and after the appurtenance device starts the power consumption operation is larger than or equal to the fifth threshold. When an unauthorized product is not able to perform the power consumption operation, there is no change in the measured current values that is larger than or equal to the change in current values due to the normal operation. Therefore determining whether there is a change in measured current values that is larger than or equal to the fifth threshold facilitates authenticity determination of the appurtenance device.

In some embodiments, the appurtenance device includes a memory circuit. The memory circuit is configured to retain a reference current value. The determination unit is configured to read the reference current value from the memory circuit.

According to such embodiments, the reference current value is stored in the memory circuit of the appurtenance device. Different appurtenance devices have different reference current values, depending on the device structure, the manufacturing process, and the like. Thus storing the reference current values obtained for a certain appurtenance device in the memory circuit of the appurtenance device facilitates management of the reference current values that differ from device to device.

A non-transitory computer-readable recording medium according to another aspect of the present disclosure includes a program configured to cause an on-board computer of an information processing device to which an appurtenance device is to be connected, the information processing device including a power supply unit configured to supply power to the appurtenance device, and a current measurement unit configured to measure a current from the power supply unit to the appurtenance device, to function as control means that causes the appurtenance device to perform a predetermined power consumption operation for authentication of the appurtenance device in addition to a normal operation, and determination means that determines whether the appurtenance device is an authorized or an unauthorized product, based on a measured current value measured by the current measurement unit in a period when the appurtenance device performs the power consumption operation and a known reference current value that is a current value in the power consumption operation by an authorized or an unauthorized product. The power supply unit, the current measurement unit, the control means, and the determination means may comprise suitable logic, circuitry, interfaces, and/or code.

In the non-transitory computer-readable recording medium according to this aspect, the control means causes the appurtenance device to perform the predetermined power consumption operation for authentication of the appurtenance device in addition to the normal operation. The determination means determines whether the appurtenance device is an authorized or an unauthorized product, based on a measured current value measured by the current measurement unit in a period when the appurtenance device performs the power consumption operation and a known reference current value that is a current value in the power consumption operation by an authorized product (or unauthorized product). When an unauthorized product is not able to perform the power consumption operation, the measured current value does not match the reference current value. Thus authenticity determination of the appurtenance device is readily performable by the determination means. Even when an unauthorized product is able to perform the power consumption operation, since an authorized and an unauthorized products have different power consumption characteristics due to differences in the device structure, the manufacturing process, and the like, the measured current value of an unauthorized product (or authorized product) does not match the reference current value of an authorized product (or unauthorized product). Thus authenticity determination of the appurtenance device is readily performable by the determination means. Moreover, since the power consumption operation for authentication of the appurtenance device is not the normal operation of the appurtenance device but a redundant operation added to the normal operation, the appurtenance device can be caused to perform any arbitrary power consumption operation having noticeable current consumption values or current consumption values that change noticeably. In consequence, the determination means improves accuracy in authenticity determination.

A method for determining the authenticity of an appurtenance device according to another aspect of the present disclosure is a method for determining authenticity of an appurtenance device configured to be connected to an information processing device of determining whether the appurtenance device is an authorized or an unauthorized product. The information processing device includes a power supply unit configured to supply power to the appurtenance device and a current measurement unit configured to measure a current from the power supply unit to the appurtenance device. The method includes causing the appurtenance device to perform a predetermined power consumption operation for authentication of the appurtenance device in addition to the normal operation, and determining whether the appurtenance device is an authorized or an unauthorized product, based on a measured current value measured by the current measurement unit in a period when the appurtenance device performs the power consumption operation and a known reference current value that is a current value in the power consumption operation by an authorized or an unauthorized product. The power supply unit and the current measurement unit may comprise suitable logic, circuitry, interfaces, and/or code.

In the method for determining the authenticity of an appurtenance device according to this aspect, the appurtenance device is caused to perform a predetermined power consumption operation for authentication of the appurtenance device in addition to the normal operation. Whether the appurtenance device is an authorized or an unauthorized product is determined based on a measured current value measured by the current measurement unit in a period when the appurtenance device performs the power consumption operation and a known reference current value that is a current value in the power consumption operation by an authorized product (or unauthorized product). When an unauthorized product is not able to perform the power consumption operation, the measured current value does not match the reference current value. Thus authenticity determination of the appurtenance device is readily performable by the method. Even when an unauthorized product is able to perform the power consumption operation, since an authorized and an unauthorized products have different power consumption characteristics due to differences in the device structure, the manufacturing process, and the like, the measured current value of an unauthorized product (or authorized product) does not match the reference current value of an authorized product (or unauthorized product). Thus authenticity determination of the appurtenance device is readily performable by the method. Moreover, since the power consumption operation for authentication of the appurtenance device is not the normal operation of the appurtenance device but a redundant operation added to the normal operation, the appurtenance device can be caused to perform any arbitrary power consumption operation having noticeable current consumption values or current consumption values that change noticeably. In consequence, the method improves accuracy in authenticity determination.

An information processing system according to another aspect of the present disclosure includes an information processing device and an appurtenance device configured to be connected to the information processing device. The information processing device includes a power supply unit configured to supply power to the appurtenance device, and a current measurement unit configured to measure a current from the power supply unit to the appurtenance device, a controller configured to cause the appurtenance device to perform a predetermined power consumption operation for authentication of the appurtenance device in addition to a normal operation in a pause period when the appurtenance device pauses an operation in the normal operation, and a determination unit configured to determine whether the appurtenance device is an authorized or an unauthorized product, depending on whether a change in measured current values measured by the current measurement unit between before and after the appurtenance device starts the power consumption operation is larger than or equal to a predetermined threshold. The power supply unit, the current measurement unit, the controller, and the determination unit may comprise suitable logic, circuitry, interfaces, and/or code.

In the information processing system according to this aspect, the controller causes the appurtenance device to perform the predetermined power consumption operation for authentication of the appurtenance device in addition to the normal operation in the pause period when the appurtenance device pauses an operation in the normal operation. The determination unit determines whether the appurtenance device is an authorized or an unauthorized product, depending on whether a change in measured current values measured by the current measurement unit between before and after the appurtenance device starts the power consumption operation is larger than or equal to the predetermined threshold. When an unauthorized product is not able to perform the power consumption operation, there is no change in the measured current values that is larger than or equal to the change in current values due to the normal operation. Therefore determining whether there is a change in measured current values that is larger than or equal to the predetermined threshold facilitates authenticity determination of the appurtenance device. In the pause period, the current consumption and the amount of change thereof due to the normal operation are small. Thus performing the power consumption operation in the pause period makes the current consumption of the appurtenance device due to the power consumption operation apparent. In consequence, the determination unit improves accuracy in authenticity determination. Moreover, since the power consumption operation for authentication of the appurtenance device is not the normal operation of the appurtenance device but a redundant operation added to the normal operation, the appurtenance device can be caused to perform any arbitrary power consumption operation having current consumption values that change noticeably. In consequence, the determination unit improves accuracy in authenticity determination. Omitting a threshold sent from the appurtenance device to the information processing device achieves reduction in communication data between the two devices.

An information processing system according to another aspect of the present disclosure includes an information processing device and an appurtenance device configured to be connected to the information processing device. The appurtenance device includes a controller configured to perform a predetermined power consumption operation for authentication of the appurtenance device by the information processing device in addition to a normal operation in a pause period when the appurtenance device pauses an operation in the normal operation. The information processing device includes a power supply unit configured to supply power to the appurtenance device, a current measurement unit configured to measure a current from the power supply unit to the appurtenance device, and a determination unit configured to determine whether the appurtenance device is an authorized or an unauthorized product, depending on whether a change in measured current values measured by the current measurement unit between before and after the appurtenance device starts the power consumption operation is larger than or equal to a predetermined threshold. The controller, the power supply unit, the current measurement unit, and the determination unit may comprise suitable logic, circuitry, interfaces, and/or code.

In the information processing system according to this aspect, the controller performs the predetermined power consumption operation for authentication of the appurtenance device by the information processing device in addition to the normal operation in the pause period when the appurtenance device pauses an operation in the normal operation. The determination unit determines whether the appurtenance device is an authorized or an unauthorized product, depending on whether a change in measured current values measured by the current measurement unit between before and after the appurtenance device starts the power consumption operation is larger than or equal to a predetermined threshold. When an unauthorized product is not able to perform the power consumption operation, there is no change in the measured current values that is larger than or equal to the change in current values due to a normal operation. Therefore determining whether there is a change in measured current values that is larger than or equal to the predetermined threshold facilitates authenticity determination of the appurtenance device. In the pause period, the current consumption and the amount of change thereof due to the normal operation are small. Thus performing the power consumption operation in the pause period makes the current consumption of the appurtenance device due to the power consumption operation apparent. In consequence, the determination unit improves accuracy in authenticity determination. Moreover, since the power consumption operation for authentication of the appurtenance device by the information processing device is not the normal operation of the appurtenance device but a redundant operation added to the normal operation, the appurtenance device can perform any arbitrary power consumption operation having current consumption values that change noticeably. In consequence, the determination unit improves accuracy in authenticity determination. Omitting a threshold sent from the appurtenance device to the information processing device achieves reduction in communication data between the two devices.

Some embodiments of the present disclosure achieve highly accurate authenticity determination of whether an appurtenance device connected to an information processing device is an authorized or an unauthorized product.

These and other objects, features, aspects and advantages of the present disclosure will become more apparent from the following description of embodiments when taken in conjunction with the accompanying drawings.

DESCRIPTION OF EMBODIMENTS

Embodiments of the present disclosure are described in detail below referring to the drawings. It should be noted that identical reference numerals throughout the drawings indicate identical or equivalent elements.

FIG. 1 is a diagram illustrating a configuration of a memory system 1 according to an embodiment of the present disclosure. As illustrated in FIG. 1, the memory system 1 includes a host device 2, and a memory device 3 detachably connected to the host device 2. The host device 2 is an information processing device such as a personal computer, while the memory device 3 is an appurtenance device, such as a flash memory card, operable with power supplied by the host device 2. In another example, the information processing device may be a printer or a multi-functional device, while the appurtenance device may be a toner cartridge. Alternatively, the information processing device may be a gaming console, while the appurtenance device may be a memory card in which a gaming program is stored.

Figure 2:
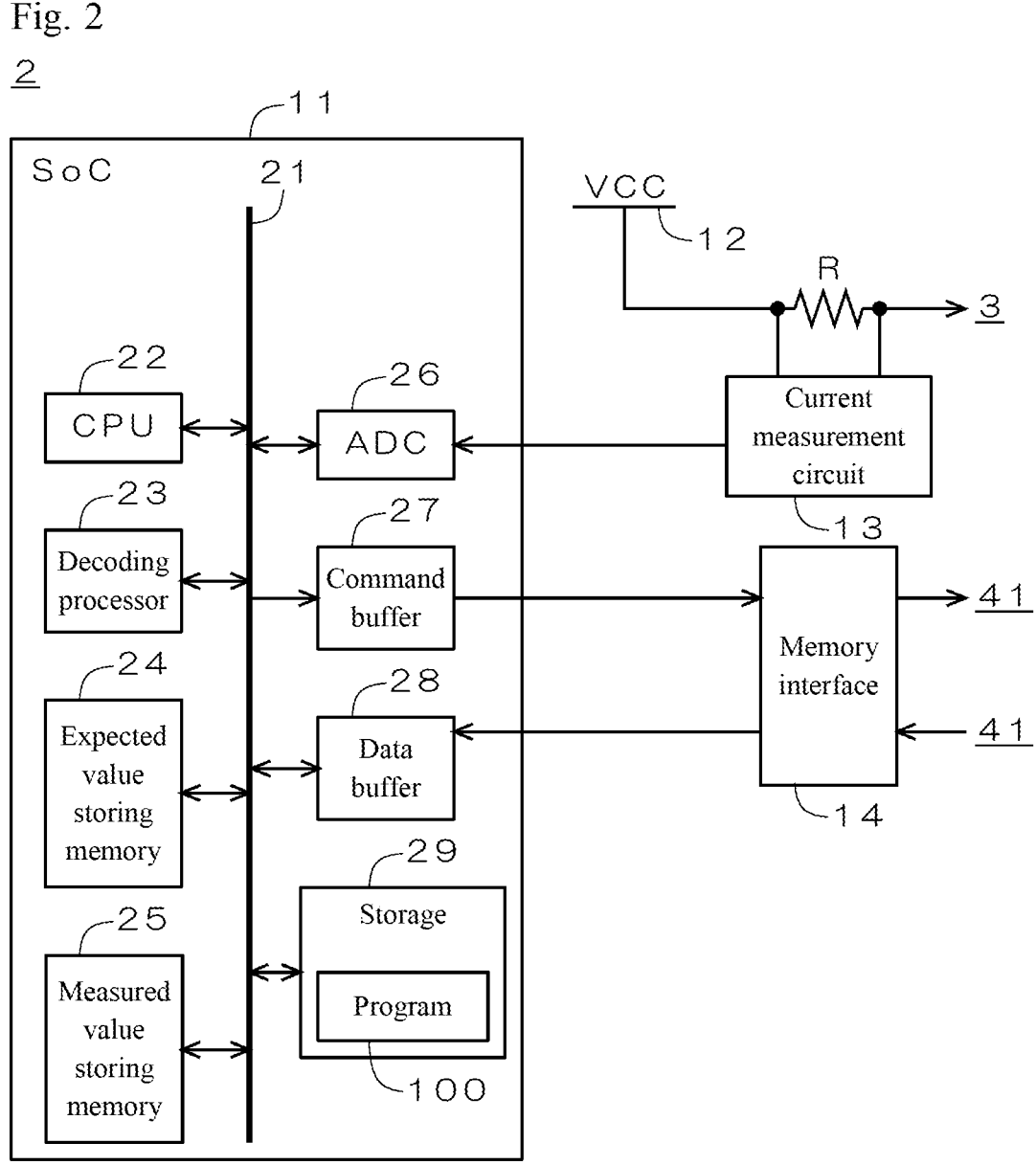
FIG. 2 is a simplified diagram illustrating a configuration of the host device.

FIG. 2 is a simplified diagram illustrating a configuration of the host device 2. As illustrated in FIG. 2, the host device 2 includes a System on a Chip (SoC) 11, a power supply unit 12, a current measurement circuit 13, and a memory interface 14. The SoC 11 includes a CPU 22, a decoding processor 23, an expected value storing memory 24, a measured value storing memory 25, an Analog to Digital Convener (ADC) 26, a command buffer 27, a data buffer 28, and a storage 29 such as ROM or RAM, connected to each other via a bus 21. The storage 29 retains a program 100. The host device 2 supplies the memory device 3 connected thereto with power to operate the memory device 3 from the power supply unit 12 via a resistance element R. The current measurement circuit 13 measures a voltage between both ends of the resistance element R to measure the value of a current passing from the power supply unit 12 to the memory device 3.

Figure 3:
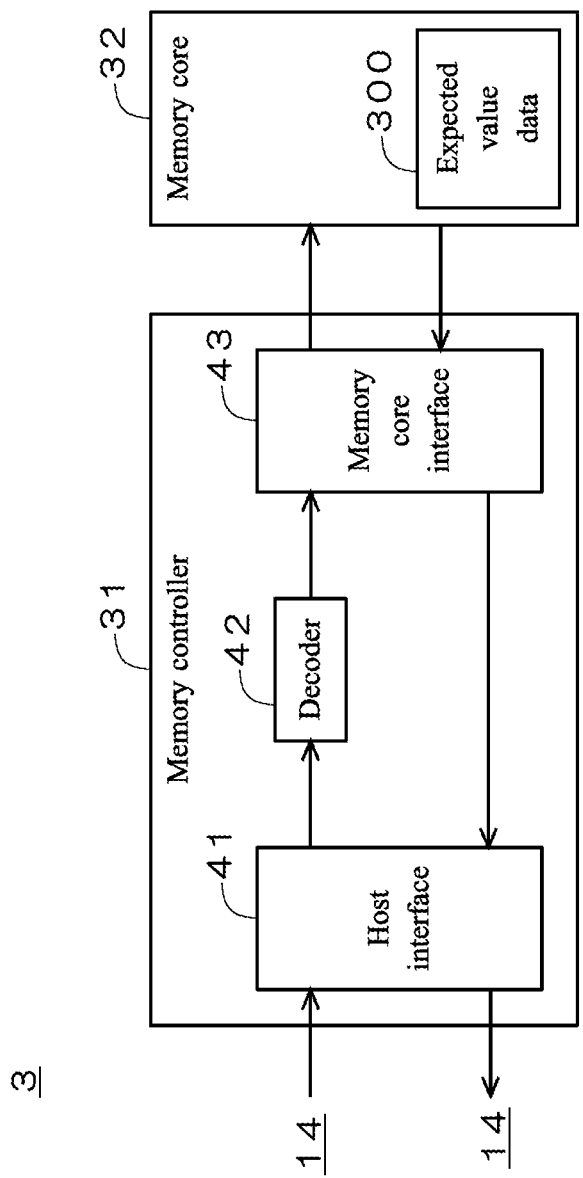
FIG. 3 is a simplified diagram illustrating a configuration of a memory device.

FIG. 3 is a simplified diagram illustrating a configuration of the memory device 3. As illustrated in FIG. 3, the memory device 3 includes a memory controller 31 and a memory core 32. The memory controller 31 includes multiple logic circuits that contribute to the normal operation of the memory device 3, among which FIG. 3 illustrates only a host interface 41, a decoder 42, and a memory core interface 43. The memory core 32 at its specific address area retains below-described expected value data 300.

Figure 4:
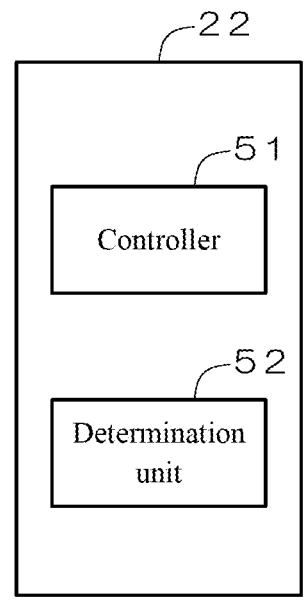
FIG. 4 is a diagram illustrating functions performed by executing a program by a CPU.

FIG. 4 is a diagram illustrating functions performed by executing the program 100 illustrated in FIG. 2 by the CPU 22. As illustrated in FIG. 4, the CPU 22 executes the program 100 read from the storage 29, to serve as a controller 51 and a determination unit 52. In other words, the program 100 causes a computer in the host device 2 being an information processing device to serve as the controller 51 and the determination unit 52.

Figure 5:
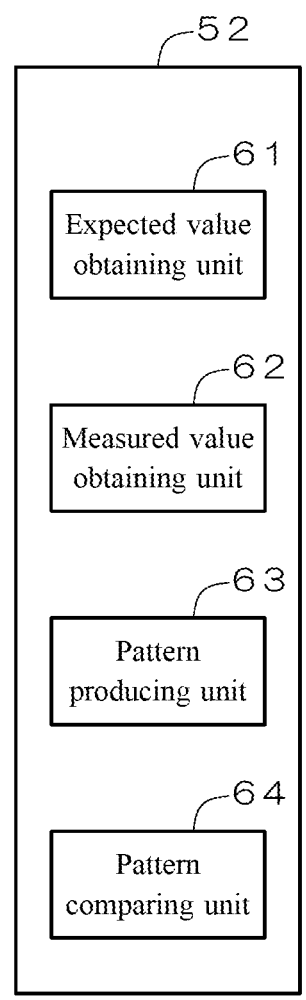
FIG. 5 is a diagram illustrating functions of a determination unit.

FIG. 5 is a diagram illustrating functions of the determination unit 52. As illustrated in FIG. 5, the determination unit 52 serves as an expected value obtaining unit 61, a measured value obtaining unit 62, a pattern producing unit 63, and a pattern comparing unit 64.

Authorized memory devices 3 (genuine products) noticeably differ from unauthorized products (counterfeit products) in current consumption characteristics, due to differences in the structure, the manufacturing process, and the like of semiconductor devices. In the host device 2 according to the present embodiment, the controller 51 causes the memory device 3 to perform a predetermined power consumption operation for authenticating the memory device 3 in addition to the normal operation. The determination unit 52 determines whether the memory device 3 is an authorized or an unauthorized product, on the basis of a measured current value measured by a current measurement circuit 13 in a period in which the memory device 3 performs a power consumption operation and a known reference current value which is a current value in a power consumption operation by an authorized or an unauthorized product. More detailed description is given below with reference to drawings.

Figure 6:
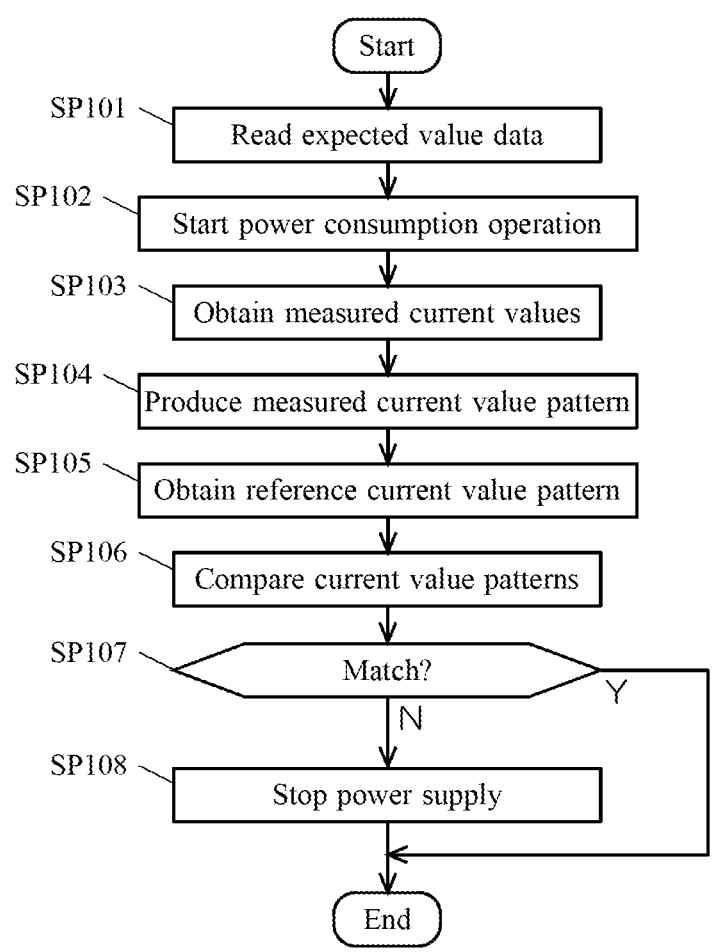
FIG. 6 is a flow chart illustrating authenticity determination of the memory device by the host device.
Figure 7:
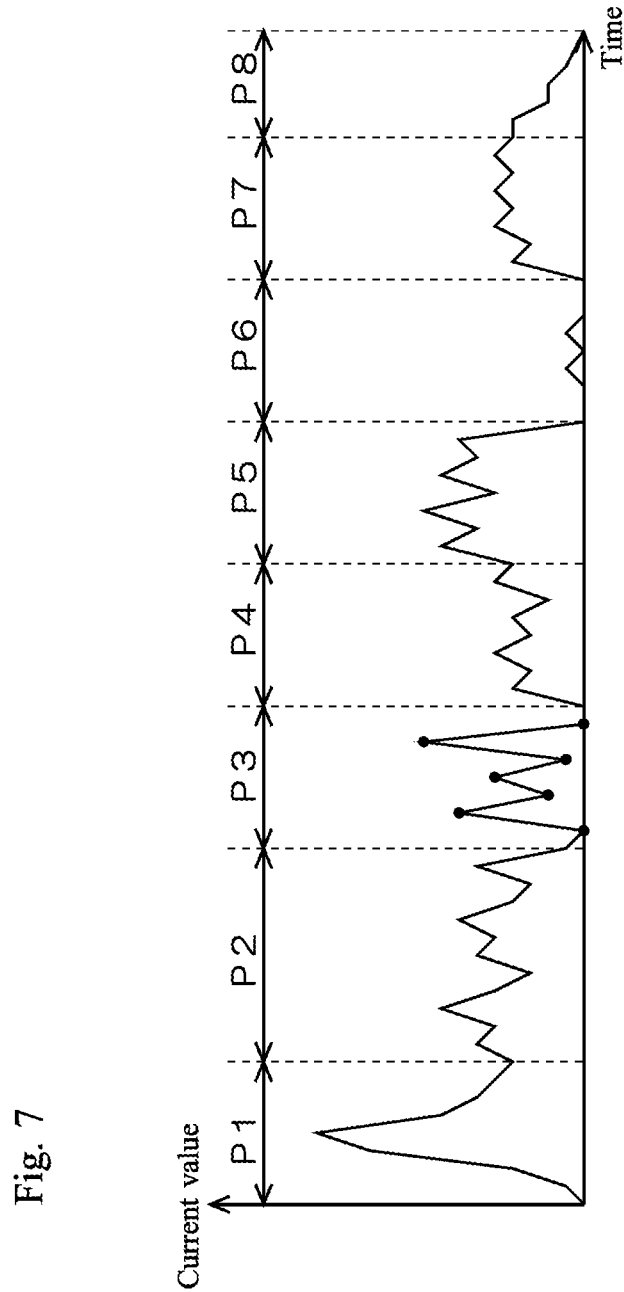
FIG. 7 is a diagram illustrating an example of current consumption characteristics of the memory device.

FIG. 6 is a flow chart for illustrating authenticity determination of the memory device 3 by the host device 2. FIG. 7 is a diagram illustrating an example of the current consumption characteristics of the memory device 3. The normal operation of the memory device 3 means processes performed in multiple periods P. In the example illustrated in FIG. 7, the normal operational period in which the normal operation is performed is divided into eight periods P1 to P8 laid in this order. For example, the period P1 is a power-on period soon after startup, the period P2 is an initialization period for initializing various settings, the periods P3 and P6 are standby periods in which the memory device 3 pauses the operation, the period P4 is a key-exchange period for mutual authentication, the period P5 is an authentication period in which mutual authentication is performed with exchanged keys, the period P7 is an application-executing period, and the period P8 is a power-off period for shutdown. Other examples of the periods P include a command input period, a memory core access period, a data read period, a data write period, a data delete period, a data communication period, and the like.

The controller 51 in the host device 2 causes the memory controller 31 in the memory device 3 to perform a predetermined power consumption operation for authentication of the memory device 3. More specifically, a specific logic circuit among the multiple logic circuits of the memory controller 31 is caused to perform a preset specific operation to generate consumed power due to the specific operation. The specific logic circuit as a target for the power consumption operation preferably has such current consumption due to the specific operation that is relatively large in value and changes distinctively.

Authorized memory devices 3, for which the types of semiconductor devices to be implemented and the manufacturing processes of each device are strictly controlled, would show almost consistent current consumption characteristics when the specific logic circuit performs the specific operation by the power consumption operation. Thus information on the current consumption characteristics due to a power consumption operation is produced before factory shipments, and stored as encoded expected value data 300 in the specific address area of the memory core 32 (see FIG. 3). In the example according to the present embodiment, a transitional pattern (reference current value pattern) of the values of current consumption obtained by sampling the values of current consumption due to the power consumption operation at a predetermined sampling frequency is stored as the expected value data 300.

When an unauthorized product to be eliminated is already identified, the reference current value pattern of the unauthorized product may be stored in the memory core 32, instead of the reference current value pattern of an authorized product. When the reference current value pattern of an authorized product is employed, whether the memory device 3 is an authorized product or not can be determined depending on whether a measured current value pattern (described in detail below) matches the reference current value pattern. When the reference current value pattern of an unauthorized product is employed, whether the memory device 3 is an unauthorized product or not can be determined depending on whether a measured current value pattern matches the reference current value pattern. In the present embodiment, description is given of an example of employing the reference current value pattern of an authorized product.

Referring to FIG. 6, in Step SP101, the controller 51 issues a read command to read the expected value data 300 from the memory device 3, and sets the command buffer 27 with the read command. The read command is sent from the command buffer 27 via the memory interface 14 to the memory device 3. The host interface 41 inputs the read command received from the host device 2 to the decoder 42. The decoder 42 decodes the inputted read command to input the read address of the expected value data 300 to the memory core interface 43. The read address is input from the memory core interface 43 to the memory core 32, and thereby the expected value data 300 is read from the memory core 32. In the example according to the present embodiment, the reference current value pattern of an authorized product and data on a predetermined tolerance are read as the expected value data 300 from the memory core 32. The tolerance has an optimal value within a range of plus or minus several to ten-odd percent, set in advance depending on, for example, the way current values are distributed in the reference current value pattern. The read expected value data 300 is sent as encoded via the memory core interface 43 and the host interface 41 to the host device 2. The memory interface 14 stores the expected value data 300 received from the memory device 3 in the data buffer 28. The controller 51 transfers the expected value data 300 stored in the data buffer 28 to the decoding processor 23, and the decoding processor 23 decodes the encoded expected value data 300. The controller 51 transfers the decoded expected value data 300 to the expected value storing memory 24. By the above processes, data on the reference current value pattern and the tolerance is stored in the expected value storing memory 24. Then the controller 51 drives the ADC 26.

In Step SP102, the controller 51 issues a control command for causing a power consumption operation, and sets the command buffer 27 with this control command. This control command causes a specific logic circuit among multiple logic circuits of the memory controller 31 to perform a preset specific operation. The control command also specifies a period in which this specific operation is to be performed. In the example according to the present embodiment, the period specified as one for performing the specific operation is a "standby period." The control command is sent from the command buffer 27 via the memory interface 14 to the memory device 3. The host interface 41 inputs the control command received from the host device 2 to the decoder 42. The decoder 42 decodes the inputted control command and inputs a control instruction to cause the specific operation designated by the control command to the specific logic circuit designated by the control command. The specific logic circuit recognizes that the memory device 3 has entered the standby period by a chip select signal being negated, and starts the specific operation instructed by the control instruction. The specific operation (i.e., power consumption operation) is performed in the background in the standby period of the memory device 3.

In Step SP103, the measured value obtaining unit 62 obtains the measured current values. The details are as follows. When the memory device 3 starts the power consumption operation, a current due to the operation passes from the power supply unit 12 of the host device 2 via the resistance element R to the memory device 3. The current measurement circuit 13 samples the voltage between both ends of the resistance element R at a predetermined sampling frequency (for example, one to several megahertz), to measure the values of the current passing from the power supply unit 12 to the memory device 3. The measured current values are amplified by a preamplifier not illustrated in the figure, and A/D converted by the ADC 26. The controller 51 stores the measured current value converted into digital values in the measured value storing memory 25. The measured value obtaining unit 62 obtains the measured current values stored in the measured value storing memory 25 from the measured value storing memory 25. Instead of amplifying the measured current values by the preamplifier before A/D conversion by the ADC 26, the measured current values may be A/D converted by the ADC 26 and then amplified by a multiplier.

In Step SP104, the pattern producing unit 63 chronologically arranges the measured current values obtained by the measured value obtaining unit 62, to produce a measured current value pattern. FIG. 7 illustrates an example where the power consumption operation is performed in the standby period P3, and the measured current value pattern in the standby period P3 is produced.

In Step SP105, the expected value obtaining unit 61 obtains the reference current value pattern and the data on the tolerance from the expected value storing memory 24.

In Step SP106, the pattern comparing unit 64 compares the measured current value pattern produced by the pattern producing unit 63 with the reference current value pattern obtained by the expected value obtaining unit 61.

Figure 8:
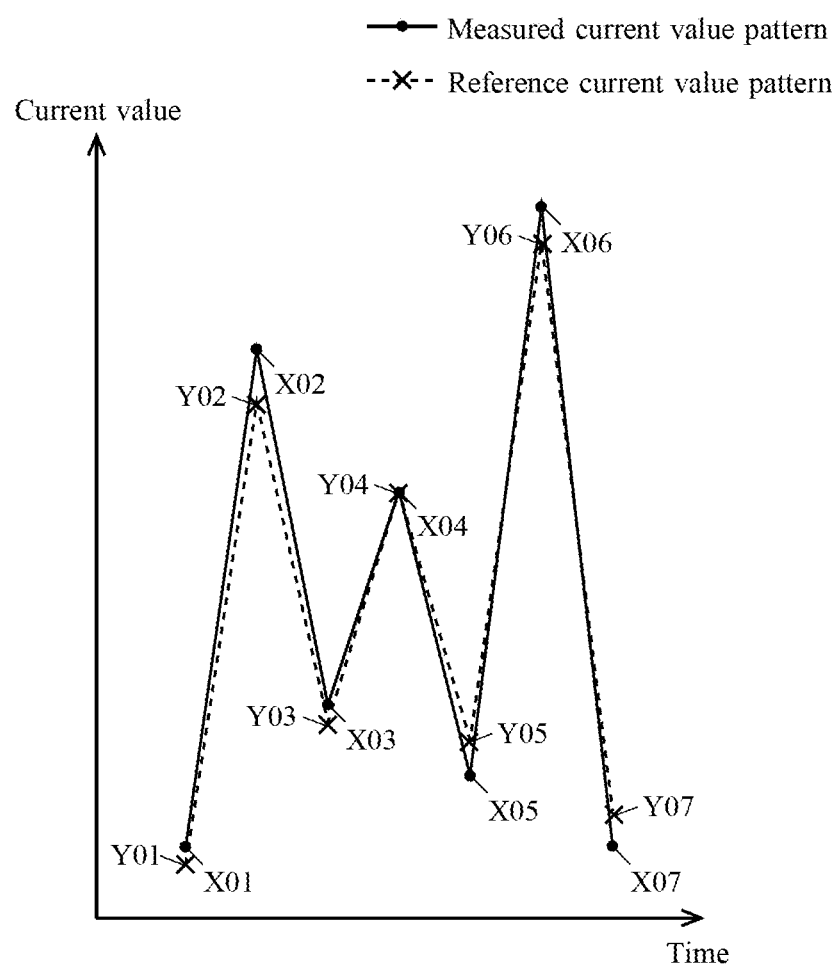
FIG. 8 is a diagram illustrating an example of a measured current value pattern and a reference current value pattern.

FIG. 8 is a diagram illustrating an example of the measured current value pattern and the reference current value pattern. When the sampling frequency of the current measurement circuit 13 is one to several megahertz and the length of the period P3 is several to several dozen milliseconds, the measured current value pattern and the reference current value pattern actually include several hundred thousand to several million current values each. FIG. 8 illustrates, in order to facilitate the description, the measured current value pattern and the reference current value pattern including seven measured current values X01 to X07 and reference current values Y01 to Y07, respectively. The pattern comparing unit 64 compares the differences between the corresponding measured current values X01 to X07 and reference current values Y01 to Y07 with the tolerance obtained by the expected value obtaining unit 61.

In Step SP107, the pattern comparing unit 64 determines whether the differences between the measured current values X01 to X07 and the reference current values Y01 to Y07 are smaller than or equal to the tolerance. If all of these differences are smaller than or equal to the tolerance (i.e., a perfect match), the pattern comparing unit 64 determines that the memory device 3 connected to the host device 2 is an authorized product, and terminates the authenticity determination. In the example illustrated in FIG. 8, the measured current values X01 to X07 perfectly match the reference current values Y01 to Y07, and thus the memory device 3 is determined to be an authorized product.

If at least one of the differences exceeds the tolerance (i.e., no perfect match), the pattern comparing unit 64 determines that the memory device 3 connected to the host device 2 is an unauthorized product, and starts a process to eliminate the unauthorized memory device 3. For example, power supply from the power supply unit 12 to the memory device 3 is stopped.

In the example described above, arithmetic computations to obtain the differences between the measured current values X01 to X07 and the reference current values Y01 to Y07, and arithmetic computations to compare each current value with the tolerance are performed by software processing. Alternatively, these arithmetic computations may be performed by hardware processing by dedicated operating units, to avoid increase in processing load of the CPU 22 due to enormous sampling by the current measurement circuit 13

Figure 9:
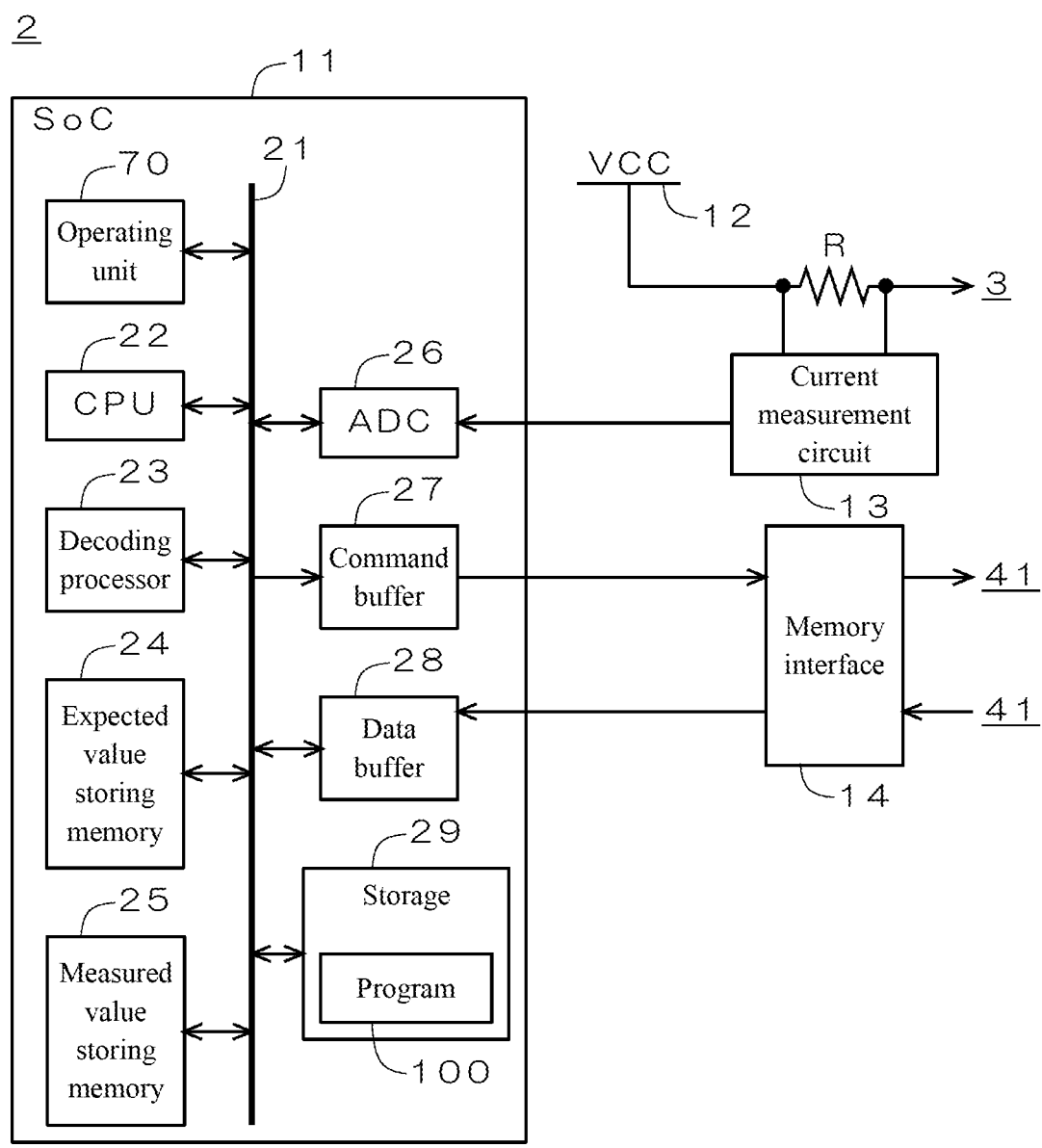
FIG. 9 is a diagram illustrating another configuration of the host device.

FIG. 9 is a diagram illustrating another configuration of the host device 2. The SoC 11 is provided with an operating unit 70. Arithmetic computations to obtain the differences between the measured current values X01 to X07 and the reference current values Y01 to Y07, and arithmetic computations to compare each difference between the current values with the tolerance are performed by the operating unit 70, and the results of these arithmetic computations are input from the operating unit 70 to the CPU 22.

As described above, in the memory system 1 (information processing system) according to the present embodiment, the controller 51 causes the memory device 3 (appurtenance device) to perform a predetermined power consumption operation for authentication of the memory device 3 in addition to the normal operation. The determination unit 52 determines whether the memory device 3 is an authorized or an unauthorized product, on the basis of the measured current values X measured by the current measurement circuit 13 (current measurement unit) in a period in which the memory device 3 performs a power consumption operation and known reference current values Y which are current values in a power consumption operation by an authorized (or unauthorized) product. When an unauthorized product is not able to decipher the control command for causing the power consumption operation and thus not able to perform the power consumption operation, the measured current values X do not match the reference current values Y. Thus authenticity determination of the memory device 3 is readily performable by the determination unit 52. Even when an unauthorized product is able to perform the power consumption operation, since an authorized and an unauthorized products have different power consumption characteristics due to differences in the device structure, the manufacturing process, and the like, the measured current values X of the unauthorized product (or authorized product) do not match the reference current values Y of an authorized product (or unauthorized product). Thus authenticity determination of the memory device 3 is readily performable by the determination unit 52. Moreover, since the power consumption operation for authentication of the memory device 3 is not the normal operation of the memory device 3 but an independent operation added to the normal operation, the memory device 3 can be caused to perform any arbitrary power consumption operation having noticeable current consumption values or current consumption values that change noticeably. In consequence, accuracy in authenticity determination by the determination unit 52 is improved.

In the information processing system 1 according to the present embodiment, the controller 51 causes the memory device 3 to perform a power consumption operation in the standby period P3 in which the memory device 3 pauses the operation in the normal operation. As illustrated in FIG. 7, in the standby period P3, the current consumption and the amount of change thereof due to the normal operation are small. Thus by performing the power consumption operation in the standby period P3, the current consumption of the memory device 3 due to the power consumption operation and the way it changes are made apparent. This makes the measured current values X in the determination unit 52 readily analyzable.

In the information processing system 1 according to the present embodiment, the controller 51 causes a specific logic circuit of the memory controller 31 (control circuit) that contributes to the normal operation of the memory device 3 to perform a power consumption operation. No need for providing the memory device 3 with an additional circuit dedicated to the power consumption operation effectively prevents increase in circuit size in the memory device 3.

In the information processing system 1 according to the present embodiment, the pattern comparing unit 64 compares the measured current value pattern produced by the pattern producing unit 63 with a known reference current value pattern having chronologically arranged reference current values Y. The determination unit 52 determines whether the memory device 3 is an authorized or an unauthorized product, on the basis of a comparison result by the pattern comparing unit 64. Since unauthorized products tend to be inferior, absolute values of current consumption of unauthorized products are often larger than those of authorized products. In the information processing system 1 according to the present embodiment, the determination unit 52 compares the measured current value pattern, rather than a pattern of rates of change in current consumption, with the reference current value pattern. This achieves highly accurate authenticity determination of the memory device 3, even when an authorized and an unauthorized products have a similar pattern of rates of change in current consumption.

In the information processing system 1 according to the present embodiment, the determination unit 52 determines whether the memory device 3 is an authorized or an unauthorized product, depending on whether all measured current values X match the corresponding reference current values Y. Thus when an unauthorized product (or authorized product) has a measured current value pattern that is different in part from the reference current value pattern of an authorized product (or unauthorized product), the authenticity determination of the memory device 3 is achieved with high accuracy.

In the information processing system 1 according to the present embodiment, the reference current values Y are stored as the expected value data 300 in the memory core 32 (memory circuit) of the memory device 3. Different memory devices 3 have different reference current values Y, depending on the device structure, the manufacturing process, and the like. Thus storing the reference current values Y obtained for a certain memory device 3 in the memory core 32 of this memory device 3 facilitates management of the reference current values Y that differ from device to device.

Description is given below of various modifications to the above embodiment. Modifications described below may be applicable in arbitrary combination.

Modification 1

In the above embodiment, authenticity determination is performed in the standby period of the memory device 3. Alternatively, it may be performed in a period other than the standby period.

Figure 10:
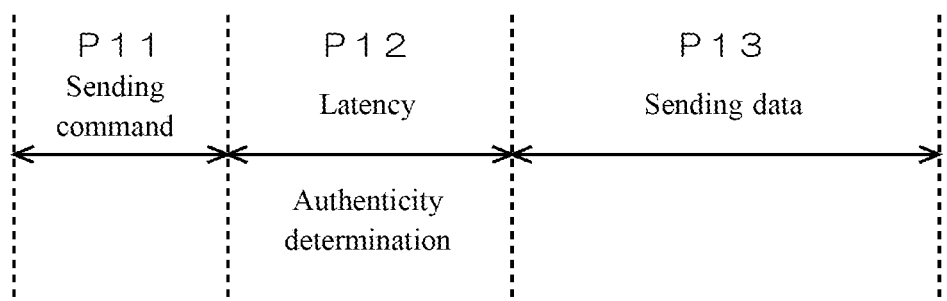
FIG. 10 is a diagram illustrating reading content data by the host device from the memory device.

FIG. 10 is a diagram illustrating reading content data by the host device 2 from the memory device 3. In a period P11, the host device 2 issues a read command and sends the read command to the memory device 3. In a period P12, the memory device 3 decodes the read command, accesses the memory core 32, and reads desired content data from the memory core 32. In a period P13, the memory device 3 sends the content data to the host device 2.

Thus for the host device 2, the period P12 is a latency time (latency period) after the read command to the memory device 3 has been sent until a response (transfer of the content data) from the memory device 3 to the host device 2 starts.

The controller 51 according to the present modification designates the latency period as a period for performing the specific operation in a control command for causing the memory device 3 to perform a power consumption operation, to perform authenticity determination of the memory device 3 in the latency time. The processes of authenticity determination are the same as in FIG. 6.

It should be noted that the memory core 32 is accessed in the latency period, and thus a consumed power for accessing the memory is generated in the memory device 3. The measured current value by the current measurement circuit 13 therefore includes the current for accessing the memory in addition to the current due to a power consumption operation for authenticity determination. The influence by the current for accessing the memory needs to be eliminated when the pattern producing unit 63 produces a current value pattern. For example, a pattern of current values for accessing the memory may be produced in advance as a referential current value pattern, so that the pattern producing unit 63 may deduct the referential current value pattern from the measured current value pattern by the current measurement circuit 13 to produce a current value pattern due to a power consumption operation for authenticity determination. A period other than the latency period and the standby period may be selected for the period for performing authenticity determination. In such case, the pattern producing unit 63 may also deduct, in a similar way to the above, a referential current value pattern corresponding to the normal operation in each period from the measured current value pattern by the current measurement circuit 13, in producing a current value pattern due to a power consumption operation for authenticity determination.

In the information processing system 1 according to the present modification, the controller 51 causes the memory device 3 to perform a power consumption operation in a latency time after a command has been sent from the host device 2 to the memory device 3 in a normal operation until a response from the memory device 3 to the host device 2 starts. Effective use of the latency time eliminates need for securing a period for performing the power consumption operation in addition to a period for performing a normal operation, which prevents delay in the normal operation due to the power consumption operation.

Modification 2

In the above embodiment, the host device 2 sends a control command to the memory device 3 to cause a power consumption operation in the memory device 3. Alternatively, the memory device 3 may voluntarily perform the power consumption operation.

Figure 11:
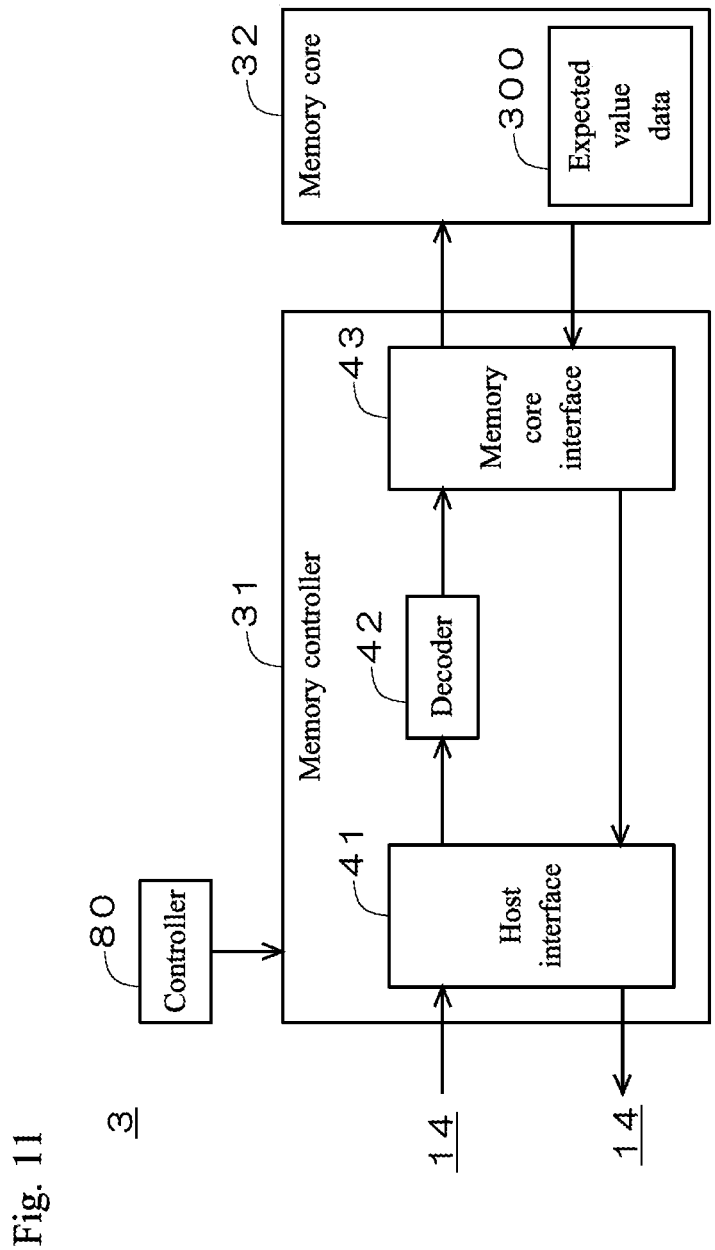
FIG. 11 is a simplified diagram illustrating a configuration of the memory device.

FIG. 11 a simplified diagram illustrating a configuration of the memory device 3. A controller 80 is added to the configuration illustrated in FIG. 3. The controller 80 causes the memory controller 31 to perform a power consumption operation for the host device 2 to authenticate the memory device 3. More specifically, in Step SP102 in the flow chart illustrated in FIG. 6, the controller 80 sets a specific logic circuit among multiple logic circuits of the memory controller 31 to perform the power consumption operation. The controller 80 also sets a specific operation for the specific logic circuit to perform as the power consumption operation. The controller 80 recognizes that the memory device 3 has entered the standby period by a chip select signal being negated, and inputs a control instruction to cause the specific operation to the specific logic circuit. Processes other than Step SP102 are the same as in the above embodiment. In a similar way to the above Modification 1, the power consumption operation may be performed in the latency period, rather than the standby period.

In the present modification, since the memory device 3 voluntarily starts the power consumption operation, the host device 2 does not need to send the control command for starting the power consumption operation to the memory device 3. In consequence, the data communications between the host device 2 and the memory device 3 are reduced. Moreover, no possibility for a third party to eavesdrop the control command on the communication path between these devices increases security.

Modification 3

In the above embodiment, the power consumption operation is performed by one of the multiple logic circuits of the memory controller 31. Alternatively, it may be performed by multiple logic circuits.

Figure 12:
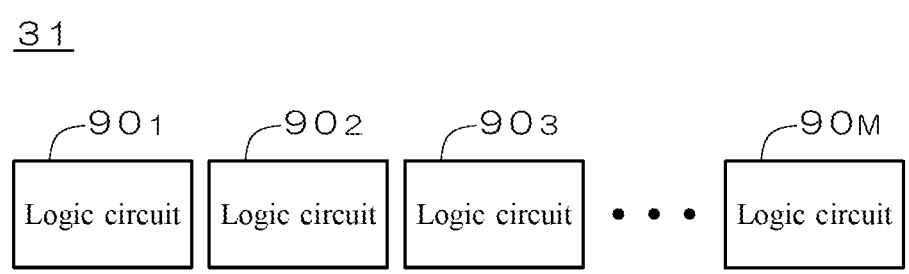
FIG. 12 is a diagram illustrating logic circuits of a memory controller.

FIG. 12 is a diagram illustrating M logic circuits $90_1$ to $90_M$ of the memory controller 31, where M is a plural number. In the present modification, reference current value patterns for each of the logic circuits $90_1$ to $90_M$ are stored in the memory core 32 as expected value data 300. In a similar way to the above embodiment, the expected value data 300 is sent from the memory device 3 to the host device 2, and the pattern producing unit 63 produces reference current value patterns for the logic circuits $90_1$ to $90_M$.

When the host device 2 instructs a power consumption operation with a control command, only the logic circuit $90_1$ among the logic circuits $90_1$ to $90M$ firstly performs the power consumption operation. The pattern comparing unit 64 compares the measured current value pattern for the logic circuit $90_1$ with the reference current value pattern for the logic circuit $90_1$ in the same processes of authenticity determination as the above embodiment. Then only the logic circuit $90_2$ performs the power consumption operation, and the pattern comparing unit 64 compares the measured current value pattern for the logic circuit $90_2$ with the reference current value pattern for the logic circuit $90_2$. The same processes are sequentially performed for the logic circuits $90_3$ to $90_M$.

When comparison between the measured current value patterns and the reference current value pattern for all logic circuits $90_1$ to $90_M$ have been performed, the determination unit 52 determines whether all measured current value patterns match the reference current value patterns in the M-time comparison. If they perfectly match, the memory device 3 is determined to be an authorized product, while if they do not perfectly match, the memory device 3 is determined to be an unauthorized product.

In the present modification, the determination unit 52 compares the measured current value pattern and the reference current value pattern for each of the M logic circuits $90_1$ to $90_M$ and determines whether the memory device 3 is an authorized or an unauthorized product, depending on whether all measured current value patterns match the reference current value pattern in the M-time comparison. Thus when an unauthorized product has measured current value patterns that are different from those of an authorized product for some of the M logic circuits $90_1$ to $901_M$, such unauthorized product is eliminated with high accuracy by the determination unit 52.

Modification 4

In the above Modification 3, the determination unit 52 determines whether the measured current value patterns perfectly match the reference current value patterns for M logic circuits $90_1$ to $90_M$.

The determination unit 52 according to the present modification determines whether a proportion of the measured current value patterns that match the reference current value patterns in the M-time comparison for the M logic circuits $90_1$ to $90M$ is larger than or equal to a first threshold. The determination unit 52 determines the memory device 3 to be an authorized product if the proportion is larger than or equal to the first threshold, while it determines the memory device 3 to be an unauthorized product if the proportion is smaller than the first threshold. The first threshold is set to an optimal value depending on required determination accuracy or the like, the value being at least 51% or larger.

In the present modification the determination unit 52 compares the measured current value patterns with the reference current value pattern for each of the M logic circuits $90_1$ to $90_M$, and determines whether the memory device 3 is an authorized or an unauthorized product, depending on whether the proportion of the measured current value patterns that match the reference current value patterns in the M-time comparison is larger than or equal to the first threshold. This effectively prevents an authorized product from being erroneously determined to be an unauthorized product, even when a measured current value pattern of the authorized product instantaneously increases or decreases in part of M logic circuits $90_1$ to $90_M$ due to unexpected noise or the like.

Modification 5

In the above embodiment, the controller 51 causes the memory controller 31 in the memory device 3 to perform a power consumption operation.

The controller 51 according to the present modification causes the memory core 32 of the memory device 3 to perform a power consumption operation. The controller 51 issues a control command for causing the power consumption operation, and in the command, designates the memory core 32 as an element to perform the power consumption operation and designates a type of the operation (for example, reading data from a specific address) and a period for performing the operation (for example, standby period). The decoder 42 of the memory device 3 decodes the control command to input a control instruction to the memory core 32 to cause the designated operation in the designated period.

In the present modification, the controller 51 causes the memory core 32 (memory circuit) that contributes to the normal operation of the memory device 3 to perform the power consumption operation. No need for providing an additional circuit dedicated to the power consumption operation effectively prevents increase in circuit size in the memory device 3.

Modification 6

In the above embodiment, the controller 51 causes the memory controller 31 that contributes to the normal operation of the memory device 3 to perform a power consumption operation. Alternatively, the memory device 3 may be provided with an additional circuit that does not contribute to the normal operation, to cause the additional circuit to perform a power consumption operation.

Figure 13:
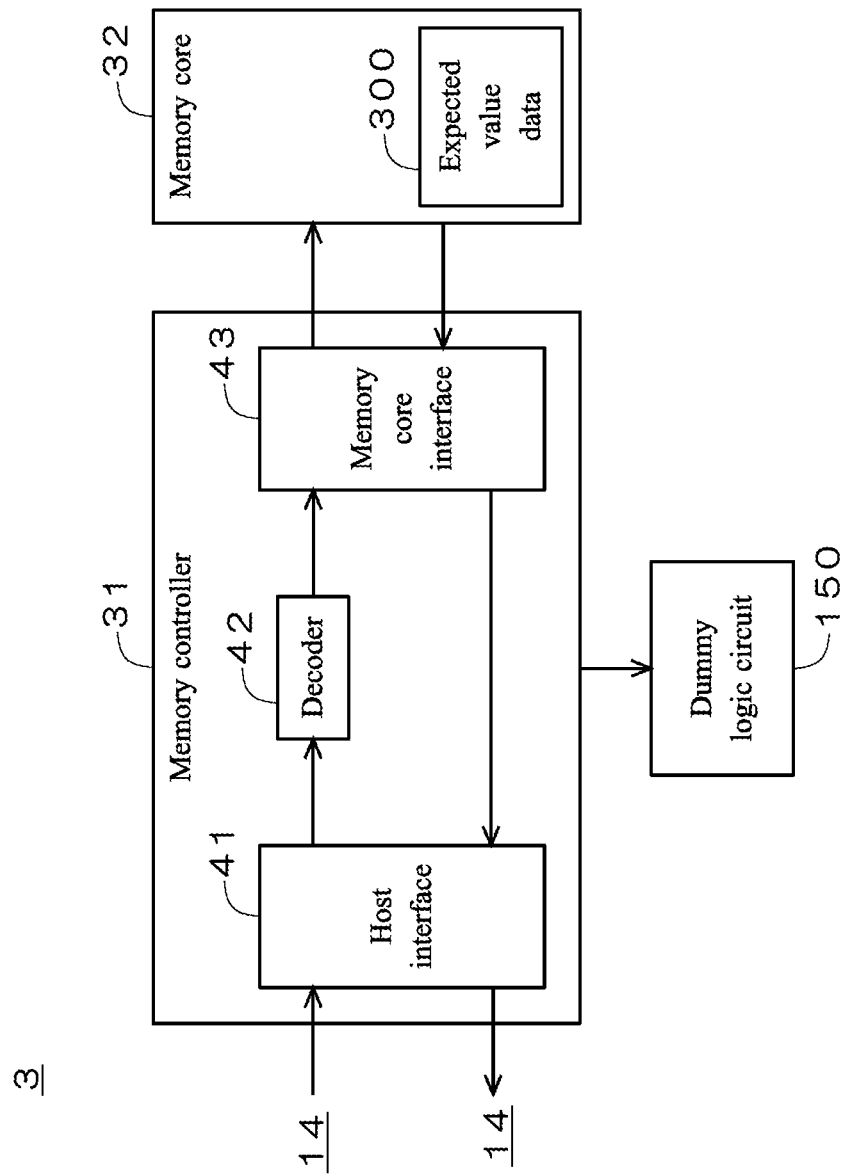
FIG. 13 is a simplified diagram illustrating a configuration of the memory device.

FIG. 13 is a simplified diagram illustrating a configuration of the memory device 3. A dummy logic circuit 150 is added to the configuration illustrated in FIG. 3. The dummy logic circuit 150 is an additional circuit that does not contribute to the normal operation, such as reading, writing, and deleting, of the memory device 3. The dummy logic circuit 150 can be an arbitrary logic circuit having such current consumption due to an operation that is relatively large in value and changes distinctively from the normal operation.

The controller 51 issues a control command for causing the power consumption operation, and in the command, designates the dummy logic circuit 150 as an element to perform the power consumption operation, and designates a type of the operation and a period for performing. The decoder 42 of the memory device 3 decodes the control command to input a control instruction to the dummy logic circuit 150 to cause the designated operation in the designated period.

In the present modification, the memory device 3 is provided with the dummy logic circuit 150 as an additional circuit that does not contribute to the normal operation. In authenticity determination of the memory device 3 the controller 51 causes the dummy logic circuit 150 to perform the power consumption operation. Causing the dummy logic circuit 150 to perform an arbitrary power consumption operation having noticeable current consumption values and current consumption values that change noticeably improves accuracy in authenticity determination by the determination unit 52.

Modification 7

In the above embodiment, the determination unit 52 determines that the memory device 3 is an authorized product, when the measured current values X01 to X07 perfectly match the reference current values Y01 to Y07.

The determination unit 52 according to the present modification determines the memory device 3 to be an authorized product if a proportion of the measured current values X01 to X07 that match the corresponding reference current values Y of all measured current values X01 to X07 is larger than or equal to a second threshold, while it determines the memory device 3 to be an unauthorized product if the proportion is smaller than the second threshold. The second threshold is set to an optimal value depending on required determination accuracy or the like, the value being at least 51% or larger.

In the present modification, the determination unit 52 determines whether the memory device 3 is an authorized or an unauthorized product, depending on whether the proportion of the measured current values X01 to X07 that match the corresponding reference current values Y01 to Y07 of all measured current values X01 to X07 is larger than or equal to the second threshold. This effectively prevents an authorized product from being erroneously determined to be an unauthorized product, even when the measured current values X01 to X07 of the authorized product instantaneously increase or decrease due to unexpected noise or the like.

Modification 8

In the above embodiment, the pattern producing unit 63 produces the measured current value pattern only once, the pattern comparing unit 64 compares the measured current value pattern with the reference current value pattern only once, and the determination unit 52 performs authenticity determination of the memory device 3 on the basis of only one comparison result by the pattern comparing unit 64.

The determination unit 52 according to the present modification performs authenticity determination of the memory device 3 on the basis of multiple comparison results by the pattern comparing unit 64.

Figure 14:
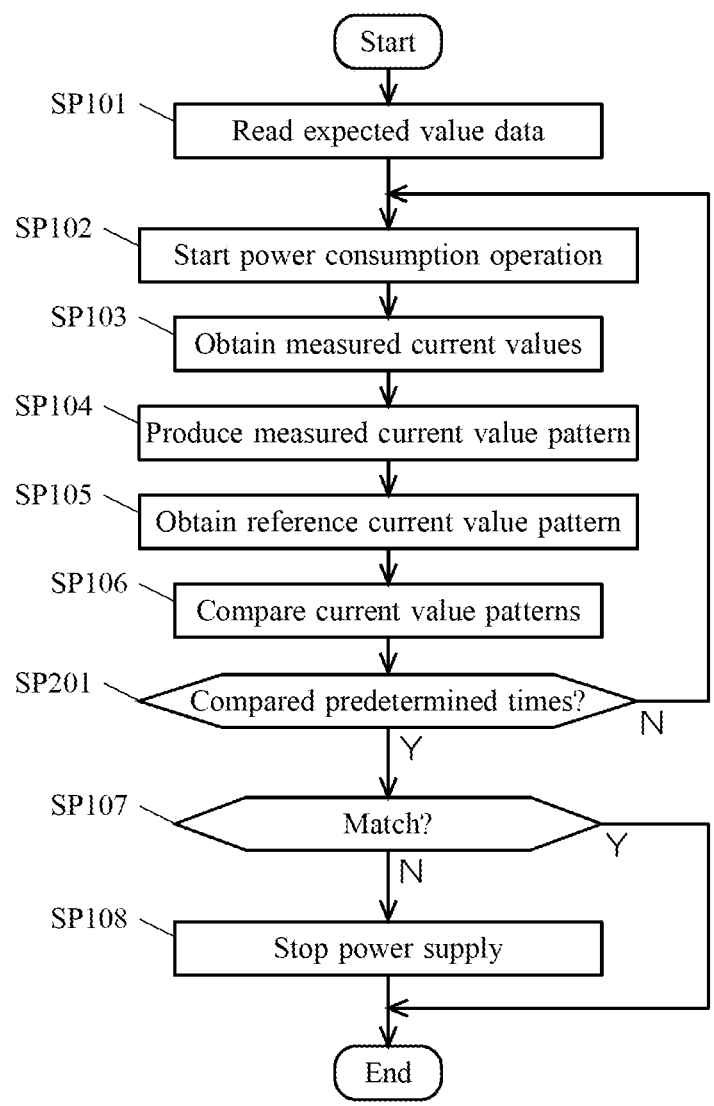
FIG. 14 is a flow chart for illustrating authenticity determination of the memory device by the host device.

FIG. 14 is a flow chart for illustrating authenticity determination of the memory device 3 by the host device 2. Following Step SP106, in Step SP201, the determination unit 52 determines whether the pattern comparing unit 64 has performed comparison between the measured current value pattern and the reference current value pattern for predetermined N times, where N is a plural number.

When the comparison has not been performed for N times, the controller 51 repeats Steps SP102 to SP106. When the comparison has been performed for N times, the controller 51 proceeds to Step SP107.

In Step SP107, the determination unit 52 determines the memory device 3 to be an authorized product, if a proportion of results that the measured current value pattern matches the reference current value pattern of the N-time comparison by the pattern comparing unit 64 is larger than or equal to a third threshold, while it determines the memory device 3 to be an unauthorized product, if the proportion is smaller than the third threshold. The predetermined N times is set to an optimal value depending on required determination accuracy or the like. The third threshold is also set to an optimal value depending on required determination accuracy or the like, the value being at least 51% or larger.

In the present modification, the determination unit 52 performs obtainment of measured current values by the measured value obtaining unit 62, production of a measured current value pattern by the pattern producing unit 63, and comparison between the measured current value pattern and the reference current value pattern by the pattern comparing unit 64 for multiple N times, and determines whether the memory device 3 is an authorized or an unauthorized product, depending on whether the proportion of results that the measured current value pattern matches the reference current value pattern of N-time comparison by the pattern comparing unit 64 is larger than or equal to the third threshold. Repeating a series of processes by the measured value obtaining unit 62, the pattern producing unit 63, and the pattern comparing unit 64 for multiple N times, and performing authenticity determination of the memory device 3 on the basis of the results of N-time comparison by the pattern comparing unit 64 improves determination accuracy.

Modification 9

In the above embodiment, the determination unit 52 performs authenticity determination of the memory device 3, on the basis of a comparison result between a measured current value pattern and a reference current value pattern by the pattern comparing unit 64.

The determination unit 52 according to the present modification performs authenticity determination of the memory device 3, on the basis of a comparison result between a change cycle of the measured current values and a change cycle of the reference current values.

Figure 15:
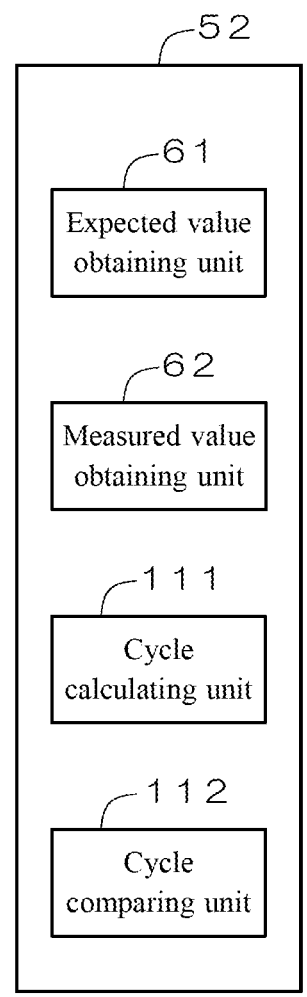
FIG. 15 is a diagram illustrating functions of the determination unit.

FIG. 15 is a diagram illustrating functions of the determination unit 52. As illustrated in FIG. 15, the determination unit 52 serves as an expected value obtaining unit 61, a measured value obtaining unit 62, a cycle calculating unit 111, and a cycle comparing unit 112.

Authorized memory devices 3, for which the types of semiconductor devices to be implemented and the manufacturing processes of each device are strictly controlled, would show almost consistent current consumption characteristics when the specific logic circuit performs the power consumption operation by the specific operation. In the present modification, a change cycle of the reference current values when the specific logic circuit performs the specific operation by the power consumption operation is stored in the memory core 32 as expected value data 300.

When an unauthorized product to be eliminated is already identified, a change cycle of the reference current values of the unauthorized product may be stored in the memory core 32, instead of a change cycle of the reference current values of an authorized product. When the change cycle of the reference current values of an authorized product is employed, whether the memory device 3 is an authorized product or not can be determined depending on whether a change cycle of the measured current values matches the change cycle of the reference current values. When the change cycle of the reference current values of an unauthorized product is employed, whether the memory device 3 is an unauthorized product or not can be determined, depending on whether a change cycle of the measured current values match the change cycle of the reference current values. In the present modification, description is given of an example of employing the change cycle of the reference current values of an authorized product.

Figure 16:
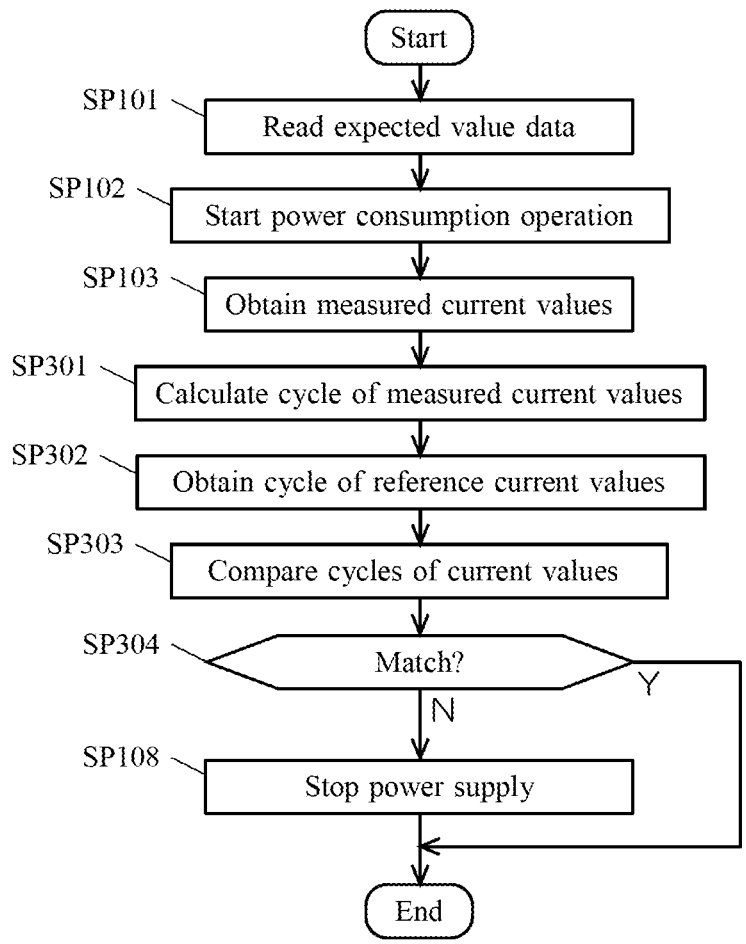
FIG. 16 is a flow chart for illustrating authenticity determination of the memory device by the host device.

FIG. 16 is a flow chart for illustrating authenticity determination of the memory device 3 by the host device 2. In Step SP101, the controller 51 reads the expected value data 300 from the memory device 3. In the present modification, the expected value storing memory 24 retains a change cycle of the reference current values and data on a predetermined tolerance of an authorized product.

In Step SP102, the controller 51 starts a power consumption operation.

In Step SP103, the measured value obtaining unit 62 obtains the measured current values.

In Step SP301, the cycle calculating unit 111 calculates a change cycle of the measured current values on the basis of intervals of peaks of the measured current values obtained by the measured value obtaining unit 62.

In Step SP302, the expected value obtaining unit 61 obtains the change cycle of the reference current values and data on the tolerance from the expected value storing memory 24.

In Step SP303, the cycle comparing unit 112 compares the change cycle of the measured current values calculated by the cycle calculating unit 111 with the change cycle of the reference current values obtained by the expected value obtaining unit 61.

In Step SP304, the cycle comparing unit 112 determines whether the difference between the change cycle of the measured current values and the change cycle of the reference current values are smaller than or equal to the tolerance. If the difference between the change cycles is smaller than or equal to the tolerance, the cycle comparing unit 112 determines that the memory device 3 connected to the host device 2 is an authorized product, and terminates authenticity determination. If the difference between the change cycles is larger than the tolerance, the cycle comparing unit 112 determine that the memory device 3 connected to the host device 2 is an unauthorized product, and starts a process to eliminate the unauthorized memory device 3.

Figure 17:
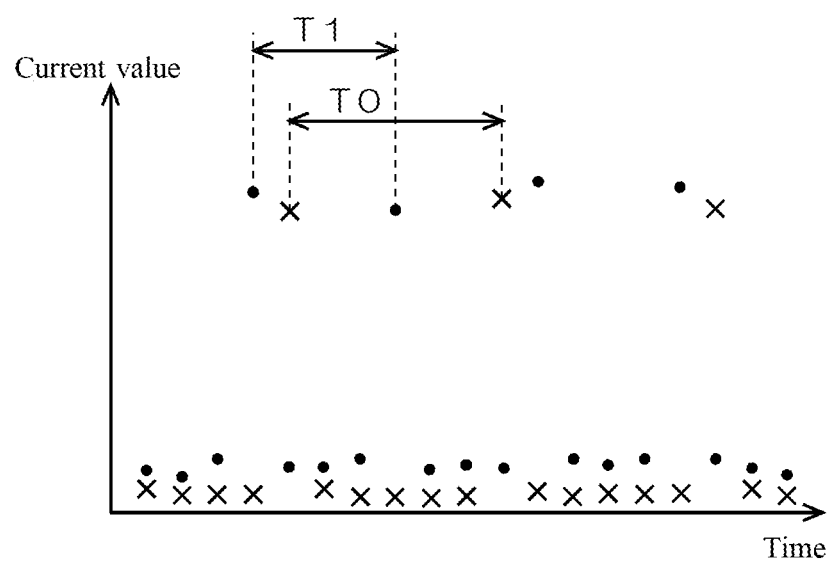
FIG. 17 is a diagram illustrating an example of measured current values and reference current values.

FIG. 17 is a diagram illustrating an example of the measured current values and the reference current values. FIG. 17 illustrates an example of the difference between the change cycle of the measured current values T1 and the change cycle of the reference current values T0, the difference being larger than the tolerance.

In the present modification, the cycle calculating unit 111 calculates the change cycle T1 of the measured current values measured by the current measurement circuit 13, and the cycle comparing unit 112 compares the change cycle T1 of the measured current values calculated by the cycle calculating unit 111 with the known change cycle T0 of the reference current values. The determination unit 52 determines whether the memory device 3 is an authorized or an unauthorized product, on the basis of a comparison result by the cycle comparing unit 112. Authorized and unauthorized products have different device structures, the manufacturing processes, and the like, resulting in difference in change cycles of the measured current values due to a power consumption operation between authorized and unauthorized products. Comparing change cycle T1 of the measured current values with the change cycle of the reference current values T0 facilitates authenticity determination of the memory device 3.

Modification 10

In the above Modification 9, the cycle calculating unit 111 calculates the change cycle of the measured current values only once, the cycle comparing unit 112 compares the change cycle of the measured current values with the change cycle of the reference current values only once, and the determination unit 52 performs authenticity determination of the memory device 3 on the basis of only one comparison result by the cycle comparing unit 112.

The determination unit 52 according to the present modification performs authenticity determination of the memory device 3 on the basis of multiple comparison results by the cycle comparing unit 112.

Figure 18:
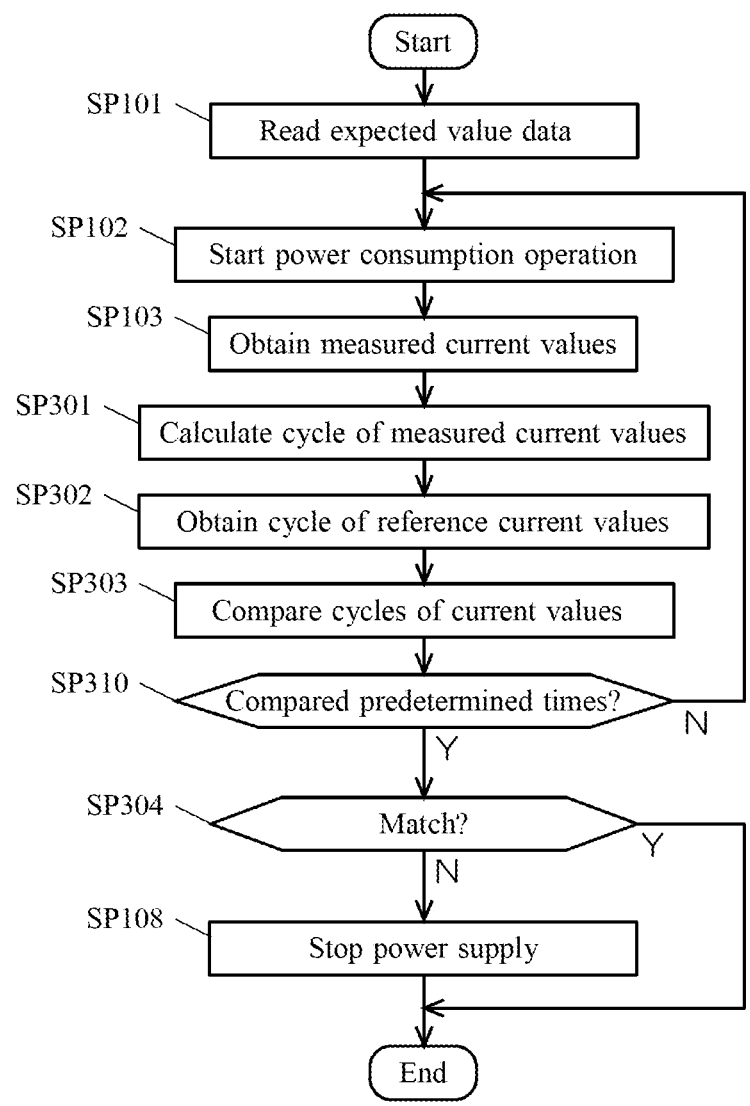
FIG. 18 is a flow chart for illustrating authenticity determination of the memory device by the host device.

FIG. 18 is a flow chart for illustrating authenticity determination of the memory device 3 by the host device 2. Following Step SP303, in Step SP310, the determination unit 52 determines whether the cycle comparing unit 112 has performed comparison between the change cycle of the measured current values and the change cycle of the reference current values for predetermined N times.

When the comparison has not been performed for N times, the controller 51 repeats Steps SP102 to SP303. When the comparison has been performed for N times, the controller 51 proceeds to Step SP304.

In Step SP304, the determination unit 52 determines the memory device 3 to be an authorized product, if a proportion of results that the change cycles of the measured current values match the change cycles of the reference current values of N-time comparison by the cycle comparing unit 112 is larger than or equal to a fourth threshold, while it determines the memory device 3 to be an unauthorized product, if the proportion is smaller than the fourth threshold. The fourth threshold is set to an optimal value depending on required determination accuracy or the like, the value being at least 51% or larger.

In the present modification, the determination unit 52 performs current measurement by the current measurement circuit 13, cycle calculation by the cycle calculating unit 111, and cycle comparison by the cycle comparing unit 112 for multiple N times, and determines whether the memory device 3 is an authorized or an unauthorized product, depending on whether the proportion of results that the change cycles of the measured current values match the change cycles of the reference current values of N-time comparison by the cycle comparing unit 112 is larger than or equal to the fourth threshold. Repeating a series of processes by the current measurement circuit 13, the cycle calculating unit 111 and the cycle comparing unit 112 for multiple N times, and performing authenticity determination of the memory device 3 on the basis of the results of N-time comparison by the cycle comparing unit 112 improves determination accuracy.

Modification 11

In the above embodiment, the determination unit 52 performs authenticity determination of the memory device 3 on the basis of a comparison result between a measured current value pattern and a reference current value pattern by the pattern comparing unit 64.

The determination unit 52 according to the present modification performs authenticity determination of the memory device 3, depending on whether change in the measured current values is larger than or equal to a fifth threshold between before and after the memory device 3 starts the power consumption operation.

Figure 19:
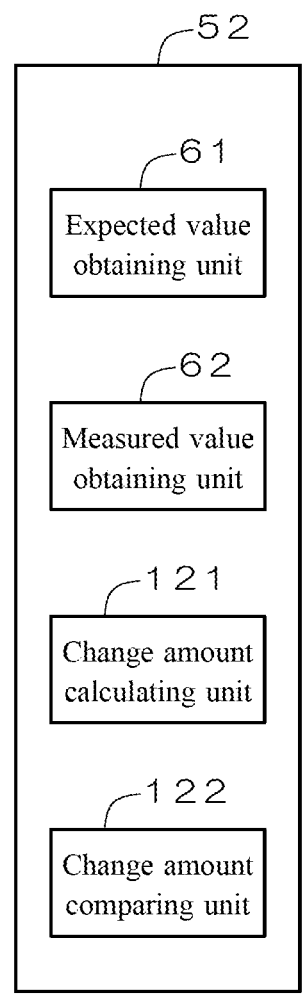
FIG. 19 is a diagram illustrating functions of the determination unit.

FIG. 19 is a diagram illustrating functions of the determination unit 52. As illustrated in FIG. 19, the determination unit 52 serves as an expected value obtaining unit 61, a measured value obtaining unit 62, a change amount calculating unit 121, and a change amount comparing unit 122.

Figure 20A:
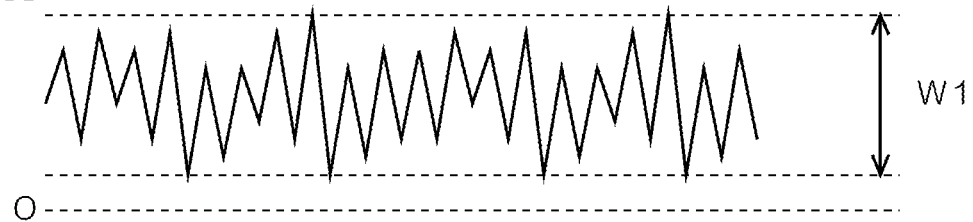
FIGS. 20A to 20C are diagrams illustrating an example of the current consumption characteristics of the memory device.
Figure 20B:
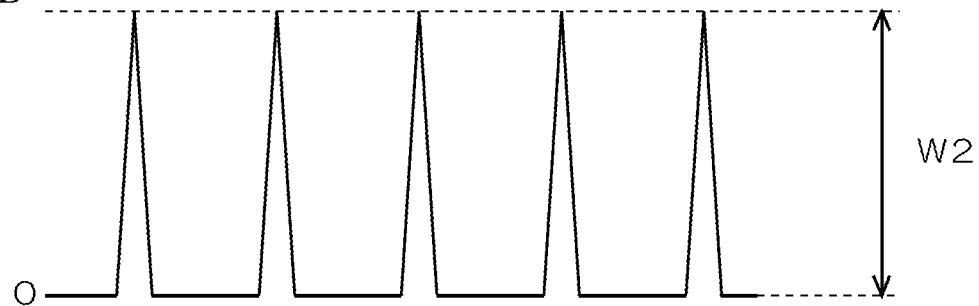
Figure 20C:
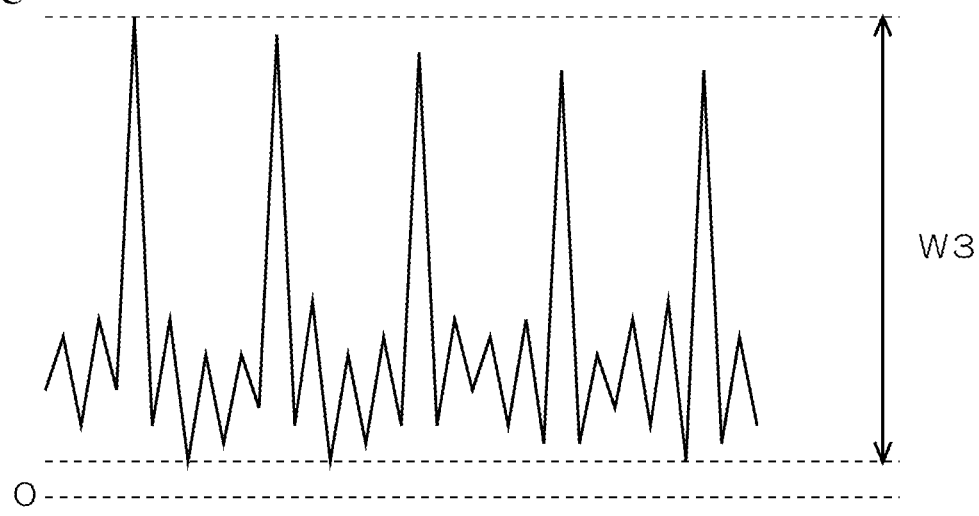

FIGS. 20A to 20C are diagrams illustrating an example of the current consumption characteristics of the memory device 3. FIG. 20A illustrates current consumption characteristics of a specific logic circuit when performing the normal operation during the normal operation, FIG. 20B illustrates current consumption characteristics of the specific logic circuit when performing a power consumption operation while the normal operation is stopped, and FIG. 20C illustrates current consumption characteristics of the specific logic circuit when performing the power consumption operation during the normal operation. The current consumption characteristics in FIG. 20C include the current consumption characteristics in FIG. 20A and the current consumption characteristics in FIG. 20B together.

As illustrated in FIGS. 20A to 20C, the amount of change in current consumption (difference between the maximum and the minimum values) of the specific logic circuit during the normal operation is indicated by W1. The amount of change in current consumption when the specific logic circuit performs a power consumption operation while the normal operation is stopped is indicated by W2. The amount of change in current consumption when the specific logic circuit performs the power consumption operation during the normal operation is indicated by W3.

In the present modification, the fifth threshold is set to an arbitrary value larger than the amount of change W1 and smaller than the amount of change W3, for example, calculated from (W3+W1)/2, the fifth threshold being stored in the memory core 32 as the expected value data 300.

Figure 21:
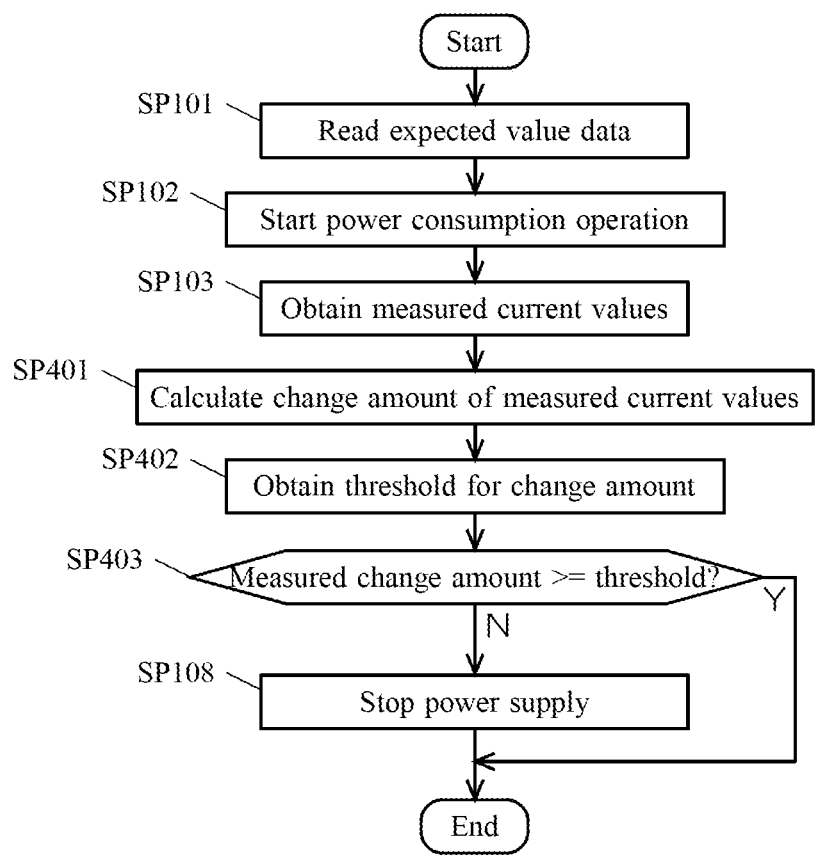
FIG. 21 is a flow chart for illustrating authenticity determination of the memory device by the host device.

FIG. 21 is a flow chart for illustrating authenticity determination of the memory device 3 by the host device 2. In Step SP101, the controller 51 reads the expected value data 300 from the memory device 3. In the present modification, the expected value storing memory 24 retains the fifth threshold.

In Step SP102, the controller 51 starts a power consumption operation.

In Step SP103, the measured value obtaining unit 62 obtains the measured current values.

In Step SP401, the change amount calculating unit 121 calculates a difference between the maximum and the minimum values of the measured current obtained by the measured value obtaining unit 62 as an amount of change of the measured current values.

In Step SP402, the expected value obtaining unit 61 obtains the fifth threshold from the expected value storing memory 24.

In Step SP403, the change amount comparing unit 122 determines whether the amount of change of the measured current values calculated by the change amount calculating unit 121 is larger than or equal to the fifth threshold obtained by the expected value obtaining unit 61. If the amount of change of the measured current values is larger than or equal to the fifth threshold, the change amount comparing unit 122 determines that the memory device 3 connected to the host device 2 is an authorized product and terminates authenticity determination. If the amount of change of the measured current values is smaller than the fifth threshold, the change amount comparing unit 122 determines that the memory device 3 connected to the host device 2 is an unauthorized product, and starts a process to eliminate the unauthorized memory device 3.

In the present modification, the period for performing the power consumption operation can be any arbitrary period in the normal operational period of the memory device 3. However, where W2<W1, the change in current due to the power consumption operation may possibly be absorbed in the change in current due to the normal operation in current consumption characteristics of the measured current values. Thus the period for performing the power consumption operation is preferably a period where the amount of change W1 due to the normal operation is smaller than the amount of change due to the power consumption operation.

In the present modification, the determination unit 52 determines whether the memory device 3 is an authorized or an unauthorized product, depending on whether the change in the measured current values measured by the current measurement circuit 13 between before and after the specific logic circuit of the memory device 3 starts the power consumption operation is larger than or equal to the fifth threshold. When an unauthorized product is not able to decipher the control command for causing the power consumption operation and thus not able to perform the power consumption operation, there is no change in the measured current values that is larger than or equal to the amount of change W1 in the current values due to the normal operation. Therefore determining whether there is a change in the measured current values that is larger than or equal to the fifth threshold facilitates authenticity determination of the memory device 3.

Modification 12

In the above Modification 11, the period for performing the power consumption operation is set to an arbitrary period in the normal operational period of the memory device 3.

In the present modification, the period for performing the power consumption operation is limited to the standby periods (P3 and P6) of the memory device 3.

Figure 22A:
FIGS. 22A to 22C are diagrams illustrating an example of the current consumption characteristics of the memory device.
Figure 22B:
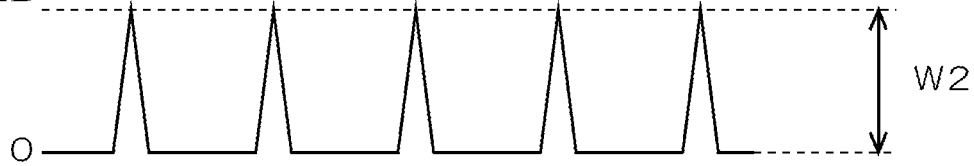
Figure 22C:
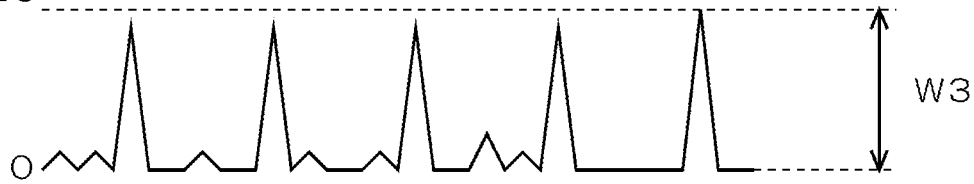

FIGS. 22A to 22C are diagrams illustrating an example of the current consumption characteristics of the memory device 3. FIG. 22A illustrates current consumption characteristics of a specific logic circuit in the standby period of the normal operation, FIG. 22B illustrates current consumption characteristics of the specific logic circuit when performing a power consumption operation while the normal operation is stopped, and FIG. 22C illustrates current consumption characteristics of the specific logic circuit when performing the power consumption operation during the standby period.

As illustrated in FIG. 22A, the current consumption and the amount of change thereof are small in the standby period of the normal operation. When the amount of change W2 is large enough, the amount of change W1 can be ignored. In such case, the amount of change W3 can be regarded as being equal to the amount of change W2, and thus fixing the specific logic circuit and the specific operation results in the amount of change W2 having a fixed value and the fifth threshold also having a fixed value (for example, W2/2). Thus by providing the host device 2 with the fifth threshold having a fixed value set in advance, the fifth threshold (expected value data 300) to be sent from the memory device 3 to the host device 2 can be omitted.

Figure 23:
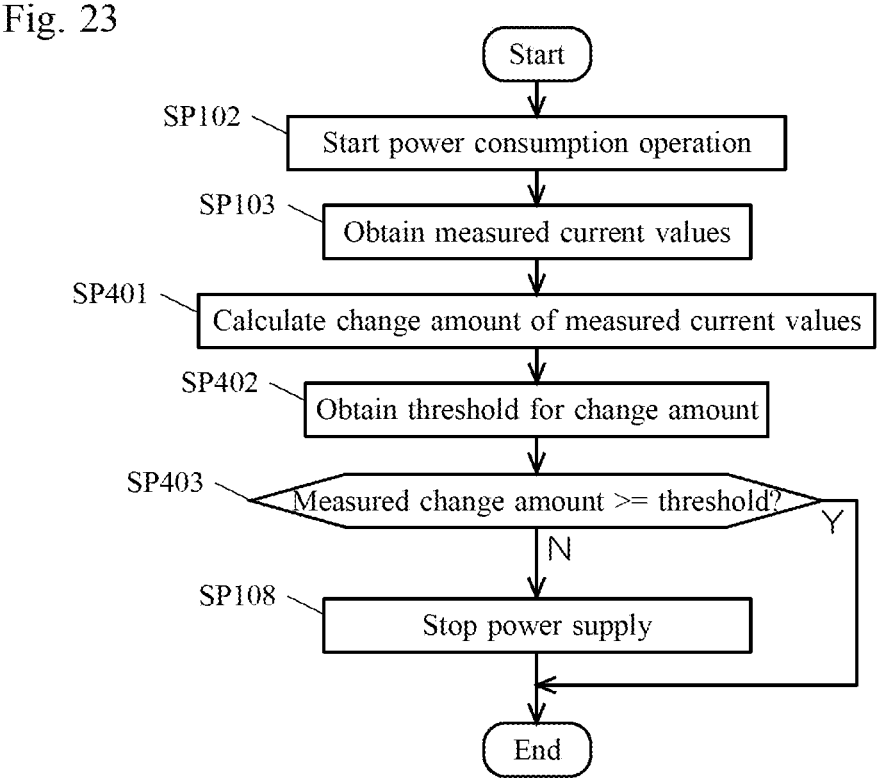
FIG. 23 is a flow chart for illustrating authenticity determination of the memory device by the host device.

FIG. 23 is a flow chart for illustrating authenticity determination of the memory device 3 by the host device 2. Step SP101 is omitted from the flow chart illustrated in FIG. 21.

In the present modification, the power consumption operation is performed in the standby period of the memory device 3. In the standby period, current consumption and the amount of change thereof due to the normal operation are small. Thus performing the power consumption operation in the standby period makes the change in current consumption of the memory device 3 due to the power consumption operation apparent. In consequence, accuracy in authenticity determination by the determination unit 52 is improved. Omitting the expected value data 300 sent from the memory device 3 to the host device 2 achieves reduction in communication data between the two devices.

The present modification is applicable to the configuration where the memory device 3 voluntarily performs the power consumption operation (Modification 2), as well as the configuration where the host device 2 sends a control command to the memory device 3 to cause the memory device 3 to perform the power consumption operation (embodiment), achieving the same advantage as the above.

While the invention has been described in detail, the foregoing description is in all aspects illustrative and not restrictive. It is understood that numerous other modifications and variations can be devised without departing from the scope of the invention.

What is claimed is:

1. An information processing system comprising:
   an information processing device, and
   an appurtenance device configured to be connected to the information processing device,
   the information processing device including circuitry configured to:
   supply power to the appurtenance device;
   measure a current from the information processing device to the appurtenance device;
   cause the appurtenance device to perform a predetermined power consumption operation for authentication of the appurtenance device in addition to a normal operation, and
   determine whether the appurtenance device is an authorized or an unauthorized product, based on a measured current value measured in a period when the appurtenance device performs the power consumption operation and a reference current value that is a current value in the power consumption operation by an authorized or an unauthorized product, wherein the circuitry for determining whether the appurtenance device is an authorized or unauthorized product is configured to
   chronologically arrange a plurality of measured current values to produce a measured current value pattern,
   compare the produced measured current value pattern with a reference current value pattern having chronologically-arranged reference current values, and
   determine whether the appurtenance device is an authorized or an unauthorized product, based on a comparison result.

2. The information processing system according to claim 1, wherein
   the circuitry is configured to cause the appurtenance device to perform the power consumption operation in a pause period when the appurtenance device pauses an operation in the normal operation.

3. The information processing system according to claim 1, wherein
   the circuitry is configured to cause the appurtenance device to perform the power consumption operation in a latency time after sending a command from the information processing device to the appurtenance device until a response from the appurtenance device to the information processing device in the normal operation.

4. The information processing system according to claim 1, wherein
   the appurtenance device includes a control circuit that contributes to the normal operation, and
   the circuitry is configured to cause the control circuit to perform the power consumption operation.

5. The information processing system according to claim 4, wherein
   the control circuit includes M logic circuits, where M is a plural number, and
   the circuitry is configured to
   cause each of the M logic circuits to perform the power consumption operation,
   compare measured current values with reference current values for the M logic circuits, and
   determine whether the appurtenance device is an authorized or an unauthorized product, depending on whether all measured current values match the reference current values in M-time comparison.

6. The information processing system according to claim 4, wherein
   the control circuit includes M logic circuits, where M is a plural number,
   the circuitry is configured to
   cause each of the M logic circuits to perform the power consumption operation,
   compare measured current values with reference current values for the M logic circuits, and
   determine whether the appurtenance device is an authorized or an unauthorized product, depending on whether a proportion of results that the measured current value matches the reference current value in M-time comparison is larger than or equal to a first threshold.

7. The information processing system according to claim 1, wherein
the appurtenance device includes a memory circuit that contributes to the normal operation, and
the circuitry is configured to cause the memory circuit to perform the power consumption operation.

8. The information processing system according to claim 1, wherein
the appurtenance device includes an additional circuit that does not contribute to the normal operation, and
the circuitry is configured to cause the additional circuit to perform the power consumption operation.

9. The information processing system according to claim 1, wherein
the circuitry is configured to
compare the measured current values composing the measured current value pattern with the reference current values composing the reference current value pattern respectively, and
determine whether the appurtenance device is an authorized or an unauthorized product, depending on whether all measured current values match corresponding reference current values.

10. The information processing system according to claim 1, wherein
the circuitry is configured to
compare the measured current values composing the measured current value pattern with the reference current values composing the reference current value pattern respectively, and
determine whether the appurtenance device is an authorized or an unauthorized product, depending on whether a proportion of measured current values that match corresponding reference current values of all measured current values is larger than or equal to a second threshold.

11. The information processing system according to claim 1, wherein
the circuitry is configured to
perform current measurement, pattern production, and pattern comparison for N times, where N is a plural number, and
determine whether the appurtenance device is an authorized or an unauthorized product, depending on whether a proportion of results that the measured current value pattern matches the reference current value pattern in N-time comparison is larger than or equal to a third threshold.

12. The information processing system according to claim 1, wherein
the circuitry is configured to
calculate a change cycle of measured current values,
compare the calculated change cycle of the measured current values with a reference change cycle of reference current values, and
determine whether the appurtenance device is an authorized or an unauthorized product based on a comparison result.

13. The information processing system according to claim 12, wherein
the circuitry is configured to
perform current measurement, cycle calculation, and cycle comparison for N times, where N is a plural number, and
determine whether the appurtenance device is an authorized or an unauthorized product, depending on whether a proportion of results that the change cycle of the measured current values matches the change cycle of the reference current values in N-time comparison is larger than or equal to a fourth threshold.

14. The information processing system according to claim 1, wherein
the circuitry is configured to determine whether the appurtenance device is an authorized or an unauthorized product, depending on whether a change in measured current values between before and after the appurtenance device starts the power consumption operation is larger than or equal to a fifth threshold.

15. The information processing system according to claim 1, wherein
the appurtenance device includes a memory circuit,
the memory circuit being configured to retain a reference current value, and
the circuitry is configured to read the reference current value from the memory circuit.

16. An information processing system comprising:
an information processing device, and
an appurtenance device configured to be connected to the information processing device,
the appurtenance device including circuitry configured to perform a predetermined power consumption operation for authentication of the appurtenance device by the information processing device in addition to a normal operation,
the information processing device including circuitry configured to:
supply power to the appurtenance device;
measure a current from the information processing device to the appurtenance device; and
determine whether the appurtenance device is an authorized or an unauthorized product, based on a measured current value measured in a period when the appurtenance device performs the power consumption operation, and a reference current value that is a current value in the power consumption operation by an authorized or an unauthorized product, wherein the circuitry for determining whether the appurtenance device is an authorized or unauthorized product is configured to
chronologically arrange a plurality of measured current values to produce a measured current value pattern,
compare the produced measured current value pattern with a reference current value pattern having chronologically-arranged reference current, values, and
determine whether the appurtenance device is an authorized or an unauthorized product, based on a comparison result.

17. The information processing system according to claim 16, wherein
the circuitry of the appurtenance device is configured to perform the power consumption operation in a pause period when the appurtenance device pauses an operation in the normal operation.

18. The information processing system according to claim 16, wherein
the circuitry of the appurtenance device is configured to perform the power consumption operation in a latency time after sending a command from the information processing device to the appurtenance device until a response from the appurtenance device to the information processing device in the normal operation.

19. The information processing system according to claim 16, wherein
the appurtenance device includes a control circuit that contributes to the normal operation, and the circuitry of the appurtenance device is configured to cause the control circuit to perform the power consumption operation.

20. The information processing system according to claim 19, wherein
the control circuit includes M logic circuits, where M is a plural number,
the circuitry of the appurtenance device is configured to cause each of the M logic circuits to perform the power consumption operation, and
the circuitry of the information processing device is configured to
compare measured current values with reference current values for the M logic circuits, and
determine whether the appurtenance device is an authorized or an unauthorized product, depending on whether all measured current values match the reference current values in NI-time comparison.

21. The information processing system according to claim 19, wherein
the control circuit includes M logic circuits, where M is a plural number,
the circuitry of the appurtenance device is configured to cause each of the M logic circuits to perform the power consumption operation, and
the circuitry of the information processing device is configured to
compare measured current values with reference current values for the M logic circuits, and
determine whether the appurtenance device is an authorized or an unauthorized product, depending on whether a proportion of results that the measured current value matches the reference current value in M-time comparison is larger than or equal to a first threshold.

22. The information processing system according to claim 16, wherein
the appurtenance device includes a memory circuit that contributes to the normal operation, and
the circuitry of the appurtenance device is configured to cause the memory circuit to perform the power consumption operation.

23. The information processing system according to claim 16, wherein
the appurtenance device includes an additional circuit that does not contribute to the normal operation, and
the circuitry of the appurtenance device is configured to cause the additional circuit to perform the power consumption operation.

24. The information processing system according to claim 16, wherein
the circuitry of the information processing device is configured to
compare the measured current values composing the measured current value pattern with the reference current values composing the reference current value pattern respectively, and
determine whether the appurtenance device is an authorized or an unauthorized product, depending on whether all measured current values match corresponding reference current values.

25. The information processing system according to claim 16, wherein
the circuitry of the information processing device is configured to
compare the measured current values composing the measured current value pattern with the reference current values composing the reference current value pattern respectively, and
determine whether the appurtenance device is an authorized or an unauthorized product, depending on whether a proportion of measured current values that match corresponding reference current values of all measured current values is larger than or equal to a second threshold.

26. The information processing system according to claim 16, wherein
the circuitry of the information processing device is configured to
perform current measurement, pattern production, and pattern comparison for N times, where N is a plural n Tiber, and
determine whether the appurtenance device is an authorized or an unauthorized product, depending on whether a proportion of results that the measured current value pattern matches the reference current value pattern in N-time comparison is larger than or equal to a third threshold.

27. The information processing system according to claim 16,
wherein the circuitry of the information processing device is configured to
calculate a change cycle of measured current values,
compare the calculated change cycle of the measured current values with a reference change cycle of reference current values, and
determine whether the appurtenance device is an authorized or an unauthorized product based on a comparison result.

28. The information processing system according to claim 27, wherein
the circuitry of the information processing device is configured to
perform current measurement, cycle calculation, and cycle comparison for N times, where N is a plural number, and
determine whether the appurtenance device is an authorized or an unauthorized product, depending on whether a proportion of results that the change cycle of the measured current values matches the change cycle of the reference current values in N-time comparison is larger than or equal to a fourth threshold.

29. The information processing system according to claim 16, wherein
the circuitry of the information processing device is configured to determine whether the appurtenance device is an authorized or an unauthorized product, depending on whether a change in measured current values between before and after the appurtenance device starts the power consumption operation is larger than or equal to a fifth threshold.

30. The information processing system according to claim 16, wherein
the appurtenance device includes a memory circuit,
the memory circuit being configured to retain a reference current value, and
the circuitry of the information processing device is configured to read the reference current value from the memory circuit.

31. A method for determining authenticity of an appurtenance device configured to be connected to an information processing device, of determining whether the appurtenance device is an authorized or an unauthorized product, the information processing device to which an appurtenance device is to be connected including circuitry configured to supply power to the appurtenance device and measure a current from the information processing device to the appurtenance device, the method comprising:
- causing the appurtenance device to perform a predetermined power consumption operation for authentication of the appurtenance device in addition to a normal operation; and
- determining whether the appurtenance device is an authorized or an unauthorized product, based on a measured current value measured in a period when the appurtenance device performs the power consumption operation and a reference current value that is a current value in the power consumption operation by an authorized or an unauthorized product, wherein determining whether the appurtenance device is an authorized or unauthorized product includes
  - chronologically arranging a plurality of measured current values to produce a measured current value pattern;
  - comparing the produced measured current value pattern with a reference current value pattern having chronologically-arranged reference current values; and
  - determining whether the appurtenance device is an authorized or an unauthorized product, based on a comparison result.

* * * * *